(12) United States Patent
Beninghaus et al.

(10) Patent No.: US 8,265,563 B2
(45) Date of Patent: Sep. 11, 2012

(54) TECHNIQUES FOR ENHANCED CO-EXISTENCE OF CO-LOCATED RADIOS

(75) Inventors: James Beninghaus, Campbell, CA (US); Jerome Tu, Saratoga, CA (US); Neil Hendin, Mountain View, CA (US); William Ngo, Fremont, CA (US); Welly Kasten, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 280 days.

(21) Appl. No.: 12/479,568

(22) Filed: Jun. 5, 2009

(65) Prior Publication Data

US 2009/0258607 A1  Oct. 15, 2009

Related U.S. Application Data

(63) Continuation-in-part of application No. 11/555,255, filed on Oct. 31, 2006, and a continuation-in-part of application No. 12/400,702, filed on Mar. 9, 2009.

(51) Int. Cl.
*H04B 1/00* (2006.01)

(52) U.S. Cl. ........... 455/63.1; 455/552.1; 455/67.13; 455/553.1; 455/226.1; 455/127.1; 455/73; 455/436; 455/456.1; 455/137; 370/329; 370/401; 370/332; 370/338; 370/373

(58) Field of Classification Search .......... 455/456.4, 455/553.1, 512, 63.1, 448, 454, 450, 77, 455/82, 552.1, 515, 226.1, 509, 551; 370/278, 370/329, 203, 319, 331
See application file for complete search history.

(56) References Cited

U.S. PATENT DOCUMENTS

| | | | | |
|---|---|---|---|---|
| 5,361,401 | A * | 11/1994 | Pirillo | 455/62 |
| 5,515,369 | A * | 5/1996 | Flammer et al. | 370/480 |
| 5,826,181 | A * | 10/1998 | Reed | 455/312 |
| 6,128,479 | A * | 10/2000 | Fitzpatrick et al. | 455/137 |
| 7,468,963 | B2 * | 12/2008 | Capretta | 370/329 |
| 7,636,336 | B2 * | 12/2009 | Forte et al. | 370/329 |
| 2004/0028003 | A1 * | 2/2004 | Diener et al. | 370/319 |
| 2005/0025164 | A1 * | 2/2005 | Kavanagh et al. | 370/401 |
| 2005/0030924 | A1 * | 2/2005 | Yano et al. | 370/332 |
| 2006/0268785 | A1 * | 11/2006 | Park et al. | 370/331 |
| 2008/0107071 | A1 * | 5/2008 | Tsigler et al. | 370/329 |

* cited by examiner

*Primary Examiner* — Matthew Anderson
*Assistant Examiner* — Ganiyu A Hanidu

(57) ABSTRACT

Techniques for enhanced co-existence for co-located radios are described. A mobile computing device may comprise a first radio module operative to communicate wirelessly across a first link using a first set of communications channels, a second radio module operative to communicate wirelessly across a second link using a second set of communications channels, and a coordination module operative to receive information regarding operation of the first and second radio modules, and modify a communications parameter for the first or second radio module based on the received information. Other embodiments are disclosed and claimed.

17 Claims, 18 Drawing Sheets

TECHNIQUES FOR ENHANCED CO-EXISTENCE OF CO-LOCATED RADIOS

RELATED APPLICATIONS

This application is a continuation-in-part, and claims priority to, the commonly-owned co-pending patent applications U.S. Ser. No. 11/555,255, entitled "COORDINATION AMONG MULTIPLE CO-LOCATED RADIO MODULES," filed Oct. 31, 2006, and U.S. Ser. No. 12/400,702, entitled "SHARED ANTENNA ARCHITECTURE FOR MULTIPLE CO-LOCATED RADIO MODULES," filed Mar. 9, 2009, which are all incorporated herein by reference in their entirety.

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Furthermore, devices may include multiple radios to handle different wireless technologies. For such a device, the use of multiple radios typically needs multiple antennas, one for each radio. Multiple antennas increase device expenses, as well as consume additional space and resources for a device. Multiple antennas may also cause mutual interference between radios. This may be particularly problematic for devices with smaller form-factors, such as a mobile computing device. As a result, performance degradation may occur. This degradation can impair or even prevent the device performing various communications applications.

Beyond antenna efficiency, the use of multiple radios creates a co-existence problem where one of the multiple radios may interfere with transmission and reception operations for another one of the multiple radios. A mobile device may attempt to alleviate this co-existence problem by utilizing only a single radio at a time. However, this also significantly reduces functionality for a mobile device. It is with respect to these and other considerations that the present improvements are needed.

DETAILED DESCRIPTION

Figure 1:
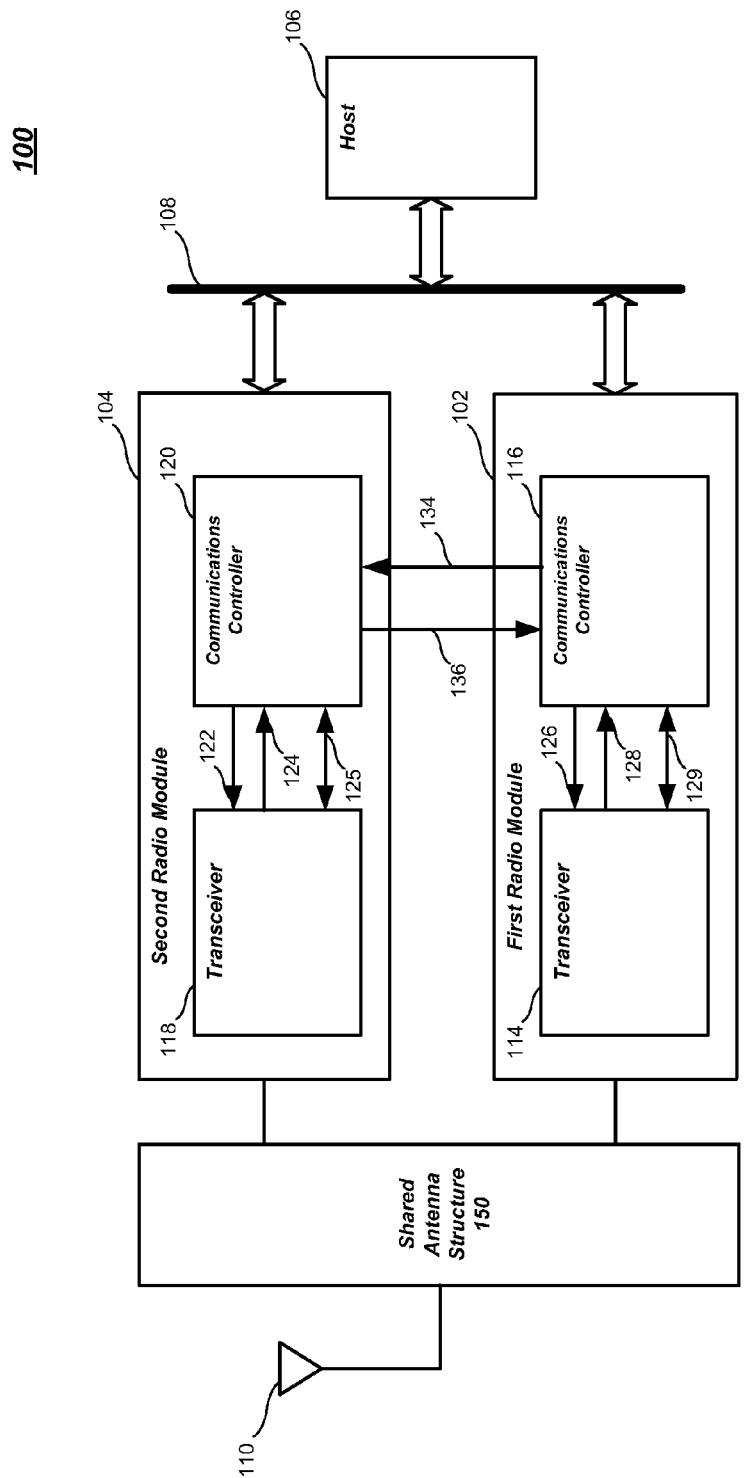
FIG. 1 illustrates one embodiment of a first apparatus.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

A mobile computing device may comprise, or be implemented as, any type of suitable portable wireless device that is consistent with the described embodiments, such as a smart phone, mobile station, portable computing device with a self-contained power source (e.g., battery), a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communications device, and so forth. The embodiments are not limited in this context.

In one embodiment, for example, a mobile computing device may be implemented as a combination handheld computer and mobile telephone, sometimes referred to as a smart phone. Examples of smart phones include various Palm® products such as Palm® Pre™, Treo™ and Centro™ smart phones, made by Palm Inc., Sunnyvale, Calif. Although some embodiments may be described with the mobile computing device implemented as a smart phone by way of example, it may be appreciated that the embodiments are not limited to this example.

A mobile computing device, such as a smart phone, may implement various types of wireless communications technologies implemented using multiple radios. When multiple radios are located within a single device, they are also referred to as co-located radios. Co-located radios often interfere with each other during periods of overlapping radio activity. As a result, conventional solutions attempt to implement complex arbitration logic built into chipsets with signaling between each radio in an attempt to coordinate radio activity. The arbitration logic tries to share a radio-frequency (RF) resource by monitoring receive and transmit requests from each radio and issuing grants to one or the other radio. However, a problem arises when the reception time or transmission time overlaps with the other radios request. Only one radio can be granted access at the same time, while the other radio is denied access to the shared communications medium. This prevents co-located radios from operating at the same time or with full or partially overlapping transmissions.

To solve these and other problems, various embodiments may be generally directed to enhanced co-existence techniques for co-located radios implementing a wide variety of wireless communications technologies. These technologies may include both cellular and data networking systems. Exemplary data networking systems include wireless local area networks (WLANs), wireless metropolitan area networks (WMANs), and personal area networks (PANs). The embodiments, however, are not limited to these examples.

In a first set of embodiments, the enhanced co-existence techniques may include various shared antenna structures arranged to allow multiple co-located radios to utilize or share a single antenna or array of antennas. The shared antenna structure may include combiner and/or switching elements to promote efficient access to a single antenna or array of antennas. In a second set of embodiments, the enhanced co-existence techniques may further include various radio coordination techniques to improve co-existence operations for multiple co-located radios. The radio coordination techniques may coordinate transmission and reception activity for co-located radios. The shared antenna structures and radio coordination techniques may be implemented separately, or in combination, for multiple co-located radios in a mobile computing device. As a result, the enhanced co-existence techniques significantly improves performance of the multiple co-located radios over conventional solutions, while decreasing costs, power requirements, form factors, and thermal emissions for a mobile computing device.

Various embodiments may be generally directed to techniques for sharing an antenna by multiple radios. Embodiments may include a mobile computing device, such as a smart phone, having an antenna, a shared antenna structure, and two or more wireless transceivers (or radios). The shared antenna structure may be arranged to allow simultaneous or mutually-exclusive use of the antenna by the two or more wireless transceivers. This provides the advantage of reducing a number of antennas implemented on a single device, particularly those with a smaller form factor, such as a mobile computing device. Furthermore, the shared antenna structure may efficiently use power provided to a mobile computing device, thereby extending battery life for the mobile computing device. As a result, a mobile computing device may be smaller, lighter and operate longer than conventional devices.

The shared antenna structure may use an innovative combination of circuit elements, such as combiners and switches, to enhance co-existence and reduce insertion loss when operating in one or both modes. For instance, when operating in one mode, the shared antenna structure may avoid the use of circuit elements used to provide the other mode, and vice-versa. This potentially avoids inefficiencies associated with the circuit elements used to provide either mode. For example, when operating in a mutually-exclusive mode, the shared antenna structure may avoid the use of one or more combiners used to provide a simultaneous mode. This reduces insertion loss associated with the combiners when the shared antenna structure is used by a single transceiver. In some cases, the insertion loss may be significant, on the order of 3.5 to 4 dB or more. The insertion loss potentially reduces the range and operational performance of the co-located radios. Consequently, reduced insertion loss may result in better power utilization and/or improved quality of wireless signals received by the transceivers. However, when operating in another mode, the shared antenna structure may allow the co-located radios to share a single antenna, thereby allowing each radio to virtually have its own antenna, with the realization that there is a corresponding amount of insertion loss when operating in this mode. Accordingly, the shared antenna structure improves co-existence of co-located radios, while reducing disadvantages associated with conventional antenna sharing techniques.

Operations for the two or more wireless transceivers may be coordinated to improve performance of the shared antenna structure when in either mode. For instance, the apparatus may also include controllers, each controlling wireless communications of a corresponding transceiver. Information may be exchanged with each other, or a central controller, regarding operation of the transceivers. Through the exchange of such information, activity (e.g., transmission and reception of wireless signals) may be coordinated among the transceivers. As a result, the transceivers may share the antenna via the shared antenna structure in a more efficient and effective manner. This may further enhance power utilization and/or improved quality of wireless signals received by the transceivers.

Additionally or alternatively, embodiments may also be directed to various radio coordination techniques to improve co-existence operations for co-located radios. Depending on a given radio coordination technique, coordination logic may send different types of coordination information to one or both of the co-located radios based on their respective radio activity or a given communications environment for the co-located radios. For instance, the coordination information may comprise control directives to modify one or more communications parameters for one or both of the co-located radios to improve co-existence between the co-located radios. Examples of communications parameters may include without limitation a fragmentation parameter, an aggregation parameter, a packet retry parameter, a rate selection parameter, a window size parameter, a frequency parameter, a clock speed parameter, a power parameter, a delay parameter, a received signal strength indicator (RSSI) level, and any other adjustable communications parameter, or information on how to interpret that information, for the co-located radios. Examples of radio coordination techniques may include without limitation spectrum channel masking techniques, data throughput limiting techniques, and probability density techniques. Examples of data throughput limiting techniques may include without limitation clock speed limiting techniques, and window size control techniques. Other radio coordination techniques are possible consistent with the described embodiments. The embodiments are not limited in this context.

Shared Antenna Structure

In a first set of embodiments, the enhanced co-existence techniques may include various shared antenna structures arranged to allow multiple co-located radios to utilize or share a single antenna or array of antennas. The shared antenna structure may include, for example, one or more combiner and/or switching elements to promote efficient access to a single antenna or array of antennas. The shared antenna structure may be arranged to allow simultaneous or mutually-exclusive use of the antenna by the two or more wireless transceivers.

FIG. 1 illustrates one embodiment of an apparatus that may communicate across different types of wireless links. In particular, FIG. 1 shows an apparatus 100 comprising various elements. The embodiments, however, are not limited to these depicted elements. FIG. 1 shows that apparatus 100 may include an antenna 110, a shared antenna structure 150, a first radio module 102, a second radio module 104, a host processor 106, and an interconnection medium 108. These elements may be implemented in hardware, software, firmware, or in any combination thereof.

Although apparatus 100 only shows two radio modules 102, 104, it may be appreciated that apparatus 100 may include more than two radio modules (and associated elements) as desired for a given implementation. Further, although apparatus 100 only shows a single antenna 110, it may be appreciated that apparatus 100 may include additional antennas for sharing with multiple transceivers. This may be desirable, for example, when a mobile computing device implements a wireless diversity scheme that utilizes an antenna array of two or more antennas to improve quality and reliability of a wireless link. An example of a wireless diversity scheme may include a multiple-input multiple-output (or variation thereof) system. In this case, one or both of the radio modules 102, 104 may share one or more antennas from the antenna array via the shared antenna structure 150.

First radio module 102 and second radio module 104 (and/or additional radio modules) may communicate with remote devices across different types of wireless links. For example, first radio module 102 and second radio module 104 may communicate across various data networking links. Examples of such data networking links include wireless local area network (WLAN) links, such as IEEE 802.11 WiFi links. Further examples include wireless metropolitan area (WMAN) links, such as IEEE 802.16 WiMAX links, and personal area networks (PAN) links such as Bluetooth links, Ultra-Wideband (UWB)/WiMedia links, and so forth.

Additionally or alternatively, first radio module 102 and second radio module 104 (and/or additional radio modules) may communicate across wireless links provided by one or more cellular systems. Exemplary cellular systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA), Narrowband Advanced Mobile Phone Service (NAMPS) systems, third generation (3G) systems such as Wide-band CDMA (WCDMA), CDMA-2000, Universal Mobile Telephone System (UMTS), UMTS Long Term Evolution (LTE), cellular radiotelephone systems compliant with the Third-Generation Partnership Project (3GPP), and relevant enhancements to these systems such as High Speed Downlink/Uplink Packet Access (HSDPA/HSUPS), High Speed Packet Access (HSPA), CDMA Evolution Data Optimized (EV-DO), and so forth. However, the embodiments are not limited to these examples. For instance, second radio module 104 may additionally or alternatively communicate across non-cellular communications links.

In one embodiment, for example, first radio module 102 is a WiFi device and second radio module 104 is a Bluetooth device. The embodiments, however, are not limited to these examples.

FIG. 1 shows that first radio module 102 includes a transceiver 114 and a communications controller 116. Transceiver 114 may transmit and receive wireless signals through an antenna 110 via shared antenna structure 150. As described above, these signals may be associated with wireless data networks, such as a WiFi link. However, the embodiments are not limited to such.

Communications controller 116 controls the operation of transceiver 114. For instance, communications controller 116 may schedule transmission and reception activity for transceiver 114. Such control and scheduling may be implemented through one or more control directives 126. Control directive(s) 126 may be based on operational status information 128, which communications controller 116 receives from transceiver 114. Also, such control directives may be based on status messages 136 received from radio module 104.

Further, communications controller 116 may perform operations on payload information 129 that it exchanges with transceiver 114. Examples of such operations include error correction encoding and decoding, packet encapsulation, various media access control protocol functions, and so forth.

As shown in FIG. 1, second radio module 104 includes a transceiver 118 and a communications controller 120. Transceiver 118 may also transmit and/or receive wireless signals through antenna 110 via shared antenna structure 150. As described above, these signals may also be associated with wireless data networks, such as a Bluetooth link. However, the embodiments are not limited to such.

Communications controller 120 controls the operation of transceiver 118. This may involve scheduling transmission and reception activity for transceiver 118. Such control and scheduling may be implemented through one or more control directives 122. Control directive(s) 122 may be based on operational status information 124, which communications controller 120 receives from transceiver 118. Also, such control directives may be based on status messages 134 received from radio module 102.

Additionally, communications controller 120 may perform operations on payload information 125 that it exchanges with transceiver 118. Examples of such operations include error correction encoding and decoding, packet encapsulation, various media access control protocol functions, and so forth.

In addition to performing the control operations described above, communications controllers 116, 120 may provide coordination between radio modules 102, 104. This coordination may involve the exchange of information. For instance, FIG. 1 shows that communications controller 116 may send status messages 134 to controller 120. Conversely, communications controller 120 may send status messages 136 to communications controller 116. These messages may be implemented as signals allocated to various signal lines. In such allocations, each message is a signal. However, further embodiments may alternatively employ data messages. Such data messages may be sent across various connections. Exemplary connections include parallel interfaces, serial interfaces, and bus interfaces.

Host processor 106 may exchange information with radio modules 102, 104. As shown in FIG. 1, such exchanges may occur across interconnection medium 108. For instance, host processor 106 may send information to these radio modules for wireless transmission. Conversely, radio modules 102 and 104 may send information to host processor 106 that was received in wireless transmissions. In addition, host processor 106 may exchange information with radio modules 102 and 104 regarding their configuration and operation. Examples of such information include control directives sent from host processor 106 to radio modules 102 and 104.

Furthermore, host processor 106 may perform operations associated with higher layer protocols and applications. For instance, host processor 106 may provide various user applications, such as telephony, text messaging, e-mail, web browsing, word processing, video signal display, and so forth. In addition, host processor 106 may provide one or more functional utilities that are available to various protocols, operations, and/or applications. Examples of such utilities include operating systems, device drivers, user interface functionality, and so forth.

Interconnection medium 108 provides for couplings among elements, such as first radio module 102, second radio module 104, and host processor 106. Thus, interconnection medium 108 may include, for example, one or more bus interfaces. Exemplary interfaces include Universal Serial Bus (USB) interfaces, Serial Peripheral Interconnect (SPI) interfaces, Secure Digital Input Output (SDIO) interfaces, universal asynchronous receiver/transmitter (UART) interfaces, as well as various computer system bus interfaces. Additionally or alternatively, interconnection medium 108 may include one or more point-to-point connections (e.g., parallel interfaces, serial interfaces, etc.) between various element pairings.

In general operation, apparatus 100 may engage in communications across multiple wireless links. However, as described above, co-located radios may need to share a single antenna (or antenna array).

In some cases, the co-located radios may need to share antenna 110 at the same time. For example, a user may desire to talk over a cellular voice call while using a Bluetooth headset, and using the internet via WiFi, or a user may desire to stream audio signals from a server over a WiFi link, and listen to the audio signals using a Bluetooth headset. In another example, a user may engage in a Voice Over Internet Protocol (VoIP) using a WiFi link, and communicate using a Bluetooth headset. In yet another example, a user may want to browse the Internet over a cellular data channel while talking on a cellular voice channel. In these cases the user may desire improved performance in a co-existence environment so that multiple radios can work together.

In other cases, the co-located radios may use antenna 110 at different times. For instance, a user may download audio files from a server over a WiFi link, and store them on a mobile computing device. The user may later listen to the stored audio files using a Bluetooth headset. In these cases the operation of the multiple transceivers may not be simultaneous, but rather sequential, so that a user may desire to have improved performance for each one stand-alone.

Conventional solutions for shared front ends are unsatisfactory for a number of reasons. For example, a switched front end offers reduced insertion loss, but performs poorly in a coexistence environment. A splitter front end performs better in the coexistence environment but suffers from permanent insertion loss offered by the splitter. Therefore both solutions provide sub-optimal performance for a mobile computing device.

Apparatus 100 solves these and other problems. In various embodiments, shared antenna structure 150 may be coupled to antenna 110 and control access to antenna 110 by the first radio module 102 and the second radio module 104. The shared antenna structure 150 may include a combiner and at least one switch arranged to allow the first transceiver 114 and the second transceiver 118 to share the antenna for simultaneous operations or mutually-exclusive operations. Simultaneous operations may refer to a mode when both transceivers 114, 118 are active and using antenna 110 at substantially the same time to transmit and/or receive wireless signals. This mode may be referred to as a "simultaneous mode." Mutually-exclusive operations may refer to a mode when one of transceivers 114, 118 is active and using antenna 110 to transmit and/or receive wireless signals. This mode may be referred to as a "mutually-exclusive mode" or "time-division switched mode." The multi-mode arrangement and operation of the shared antenna structure combine the advantages of the switched front end and splitter front end, while reducing the respective disadvantages associated with each solution. Apparatus 100 in general and shared antenna structure 150 in particular may be described in more detail with reference to FIG. 2.

Figure 2:
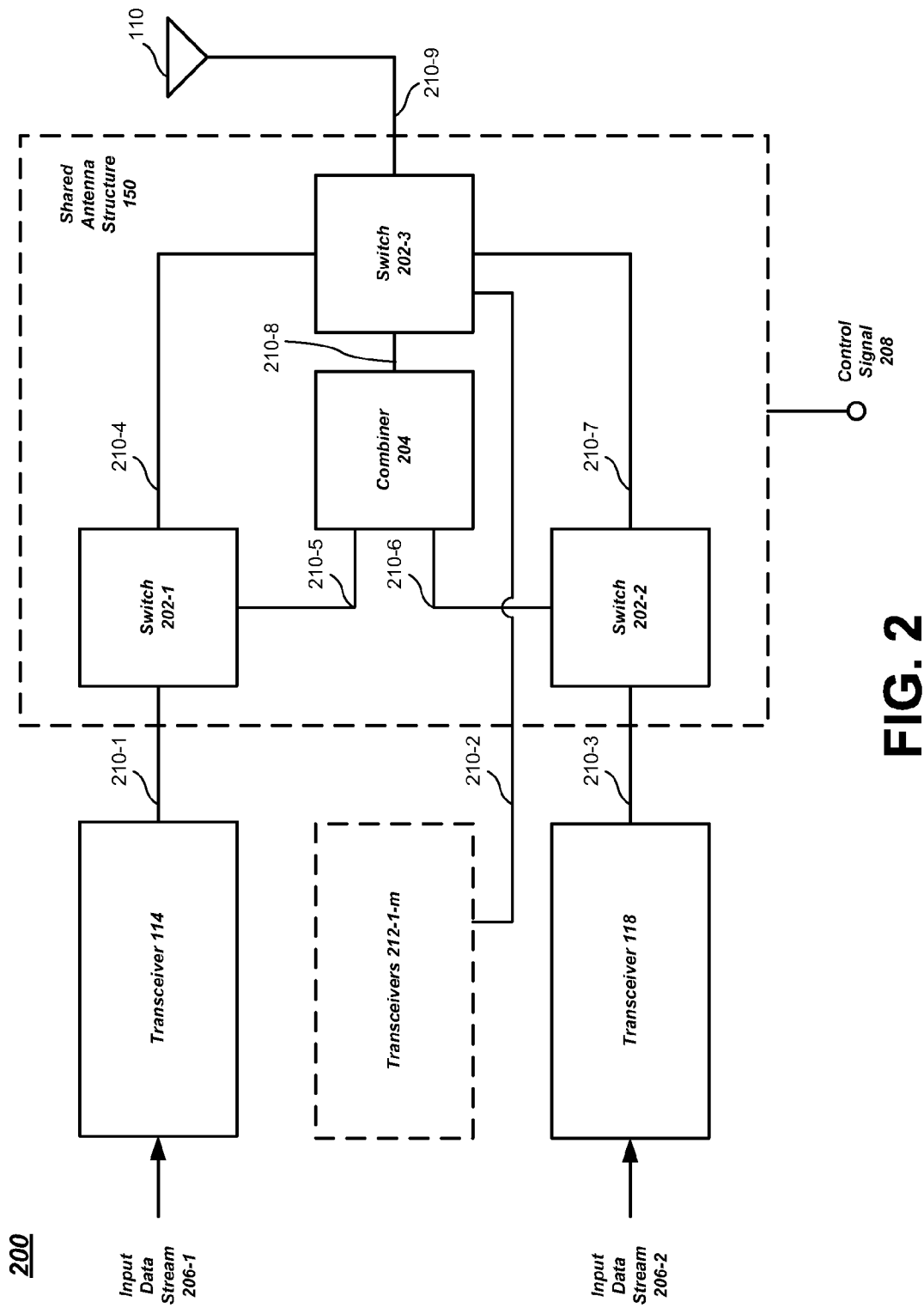
FIG. 2 illustrates one embodiment of a first shared antenna structure.

FIG. 2 illustrates an apparatus 200 having a more detailed block diagram for a first embodiment for the shared antenna structure 150. The shared antenna structure 150 shown in FIG. 2 comprises multiple switches 202-1-p and at least one combiner 204.

The switches 202-1-p may comprise any suitable circuit element capable of changing or switching connections between different input and output signal lines. Examples for the switches 202-1-p may include without limitation a n-way type of switch (e.g., 2-way switch, 3-way switch, 4-way switch, and so forth), a series of successive switches (e.g., 2 single pole double-throw switches), a cross-bar switch connecting multiple inputs to multiple outputs in a matrix manner, and so forth. A particular type of radio-frequency (RF) switch implemented for a given embodiment may vary in accordance with a standard design considerations, including switch insertion, loss a number of inputs (e.g., 1 input) and a number of outputs (e.g., 2 outputs) for the switch, and so forth. The embodiments are not limited to this example.

The combiner 204 may comprise any suitable circuit element capable of combining multiple signals into a single signal in a forward path, or splitting a single signal into multiple signals in a reverse path. The former operation is typically performed by a combiner in a transmit path, while the latter operation is typically performed by a splitter in a receive path. As used herein, the term "combiner" is used to refer to both combining and splitting operations for clarity. In one embodiment, the combiner 204 may comprise a combination combiner/splitter. In other embodiments, however, the combiner 204 may be separated into different circuit elements for performing combining operations and splitting operations, as known to those skilled in the art. Examples for the combiner 204 may include without limitation a passive combiner, a power splitter, a diplexer, a duplexer, a triplexer, a multiplexer, a demultiplexer, and so forth. A particular type of combiner (or splitter) implemented for a given embodiment may vary in accordance with a standard design considerations, including combiner insertion loss, a number of inputs (e.g., 2 input signals) and a number of outputs (e.g., 1 output signal) for the combiner, and so forth. The embodiments are not limited to this example.

In the illustrated embodiment shown in FIG. 2, a first switch 202-1 may be communicatively coupled to the first transceiver 114. A second switch 202-2 may be communicatively coupled to the second transceiver 118. The combiner 204 may be communicatively coupled to the first and second switches 202-1, 202-2. The combiner 204 may also be communicatively coupled to a third switch 202-3. The third switch 202-3 may be communicatively coupled to the first switch 202-1, the second switch 202-2, and the combiner 204. The third switch 202-3 may also be communicatively coupled to the antenna 110.

The shared antenna structure 150 may be arranged to operate in different sharing modes, including a simultaneous mode and a mutually-exclusive mode. In a simultaneous mode, both of the transceivers 114, 118 may utilize the antenna 110 at substantially the same time. In a mutually-exclusive mode, only one of the transceivers 114, 118 may utilize the antenna 110 at any point in time. The shared antenna structure 150 may be placed in a given mode in response to a control signal 208.

When operating in the simultaneous mode, in the transmit path, the transceivers 114, 118 may receive respective input data streams 206-1, 206-2, and process the respective input data streams 206-1, 206-2 for simultaneous transmission over the antenna 110. The switch 202-1 may connect lines 210-1, 210-5, and the switch 202-2 may connect lines 210-3, 210-6. The combiner 204 may combine the signals from lines 210-5, 210-6 to output the combined signal to line 210-8. The switch 202-3 may connect the lines 210-8, 210-9, thereby allowing the combined data streams 206-1, 206-2 to be simultaneously transmitted over the antenna 110. In the receive path, the signals received by the antenna 110 may follow a reverse path to the respective transceivers 114, 118.

When operating in a mutually-exclusive mode, in the transmit path, the switches 202-1-$p$ may be arranged to allow only one of the transceivers 114, 118 to access the antenna 110 at a given moment in time. For instance, when the transceiver 114 is ready to transmit (or receive), the switch 202-1 may connect lines 210-1, 210-4 and the switch 202-3 may connect lines 210-4, 210-9. This allows the transceiver 114 to transmit data stream 206-1 over the antenna 110. When the transceiver 118 is ready to transmit (or receive), the switch 202-2 may connect lines 210-3, 210-7, and the switch 202-3 may connect lines 210-7, 210-9. This allows the transceiver 118 to transmit data stream 206-2 over the antenna 110. The reverse may occur in a receive path for either transceiver 114, 118. It may be appreciated that when in the mutually-exclusive mode, the combiner 204 is removed from the signal path, thereby reducing or eliminating any disadvantages associated with the combiner 204, such as insertion loss.

It is worthy to note that if transceiver 114 implements a Transmit/Receive switch for operation that there will be multiple connections between switch 202-1 and transceiver 114, and connection 210-1 represents only one of multiple connections desired for a given implementation. It is also worthy to note that the Transmit/Receive switch function can then be combined into switch 202-1 for further optimization in reducing insertion loss on both transmit and receive.

As previously described, the shared antenna structure 150 may share the antenna 110 with multiple transceivers 114, 118. The shared antenna structure 150 may also allow any number of additional transceivers to share the antenna 110 as desired for a given implementation. For instance, the apparatus 200 is shown as having one or more additional transceivers 212-1-$m$ connected to switch 202-3, thereby allowing the one or more additional transceivers 212-1-$m$ to use the antenna 110 in a mutually-exclusive mode. The shared antenna structure 150 may form a transmit and/or a receive path between the transceiver 212-1-$m$ and the antenna 110 by having the switch 202-3 connect the lines 210-2, 210-9. It may be appreciated that additional combiners 204 and/or switches 202-1-$p$ may be added to allow the additional transceivers 212-1-$m$ to share the antenna 110 in a simultaneous mode as well. The embodiments are not limited in this context.

Figure 3:
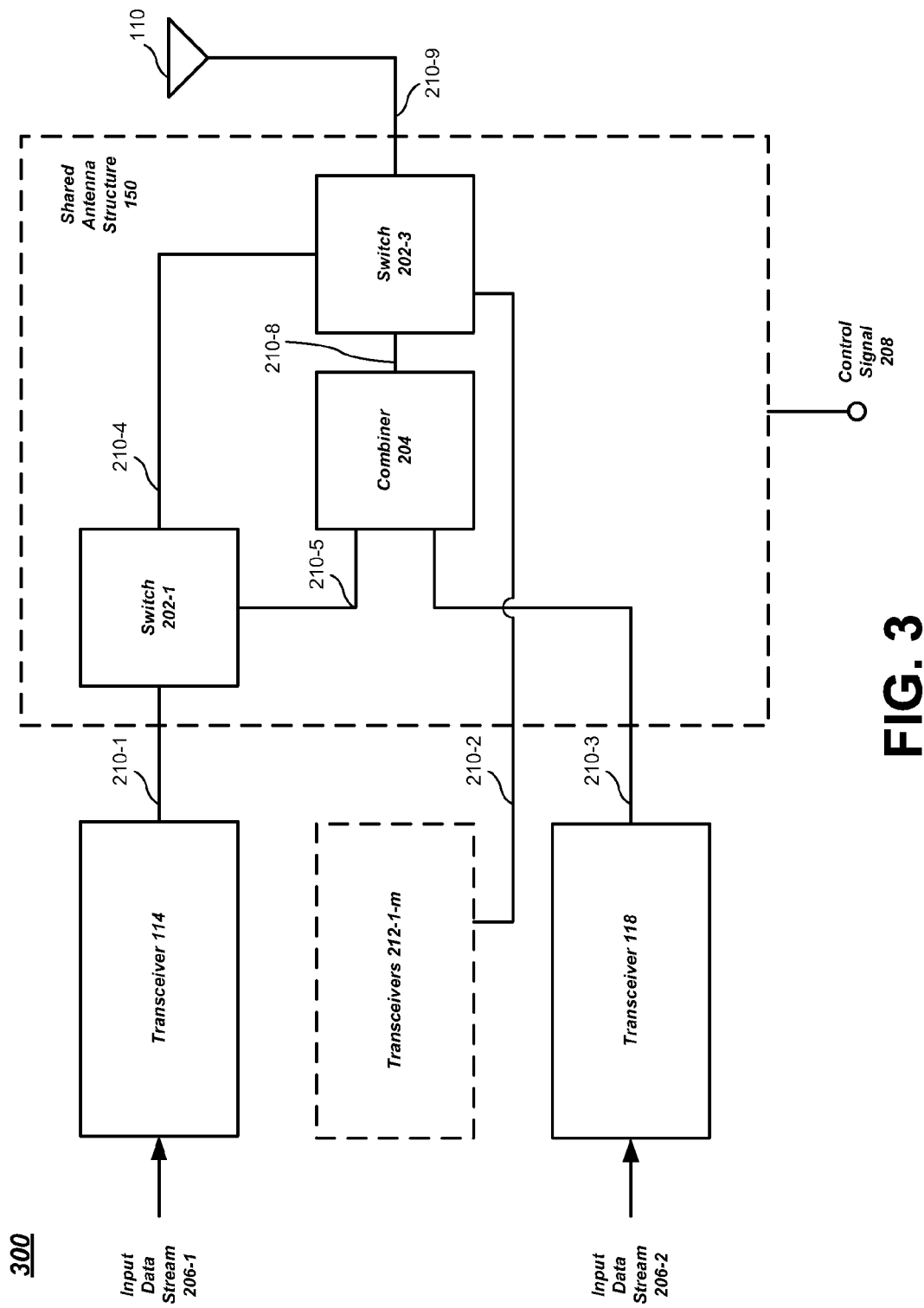
FIG. 3 illustrates one embodiment of a second shared antenna structure.

FIG. 3 illustrates an apparatus 300 having a more detailed block diagram of a second embodiment for the shared antenna structure 150. The shared antenna structure 150 shown in FIG. 3 also comprises multiple switches 202-1-$p$ and at least one combiner 204. The shared antenna structure 150 shown in apparatus 300 may be similar to the shared antenna structure 150 shown in apparatus 200. For instance, the shared antenna structure 150 may comprise the switch 202-1 communicatively coupled to the transceiver 114, the combiner 204 communicatively coupled to the switch 202-1 and the transceiver 118, and the switch 202-3 communicatively coupled to the switch 202-1 and the combiner 204. Unlike apparatus 200, however, the shared antenna structure 150 of apparatus 300 eliminates switch 202-2, thereby reducing complexity and cost for the shared antenna structure 150. This may be significant due to the relatively high costs associated with switching elements. It may be appreciated, however, that the insertion loss provided by the combiner 204 is incurred both in the simultaneous mode and when the transceiver 118 is operating in the mutually-exclusive mode. However, this may be an acceptable trade-off in cost and performance for some implementations. It may be further appreciated that a similar arrangement for the shared antenna structure 150 may be made for the transceiver 114 to shift the insertion loss penalty to transmit/receive path for the transceiver 114.

The shared antenna structure 150 may be placed in a given mode in response to a control signal 208. Control for the shared antenna structure 150 may be described in more detail with reference to FIGS. 4-6.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 4:
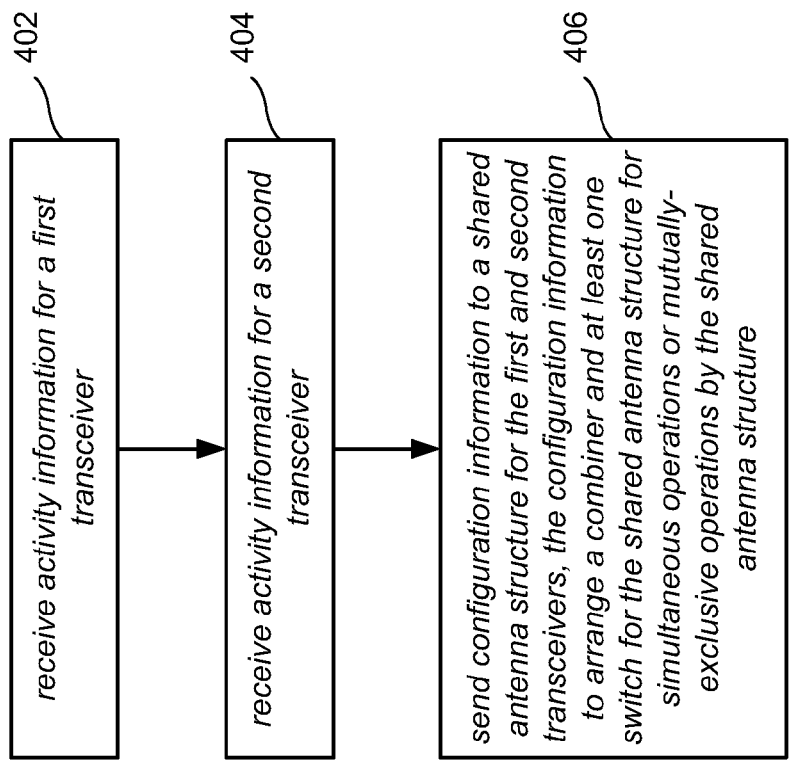
FIG. 4 illustrates one embodiment of a logic flow.

FIG. 4 illustrates one embodiment of a logic flow 400. Logic flow 400 may be representative of the operations executed by one or more embodiments described herein. For example, logic flow 400 may be operations performed by control logic to generate control signals for the shared antenna structure 150.

As shown in FIG. 4, the logic flow 400 may receive activity information for a first transceiver at block 402. The logic flow 400 may receive activity information for a second transceiver at block 404. Examples of such activity information can include, but is not necessarily limited to, such user generated events as initiation of WiFi connection, the start of datatransmission on a WiFi network, initiation of a Bluetooth audio connection, or the termination of any of these connections. The embodiments are not limited in this context.

The logic flow 400 may send configuration information to a shared antenna structure for the first and second transceivers. The configuration information may be used to arrange a combiner and at least one switch for the shared antenna structure for simultaneous operations or mutually-exclusive operations by the shared antenna structure at block 406.

In one embodiment, the logic flow 400 may be implemented by control logic for the shared antenna structure 150. The control logic may be implemented by a processor, such as the host processor 106, the communications controller 116, or the communications controller 120. This logic flow can be evaluated periodically during the operation of the mobile computing device, to adapt the configuration to the user's current needs.

Figure 5:
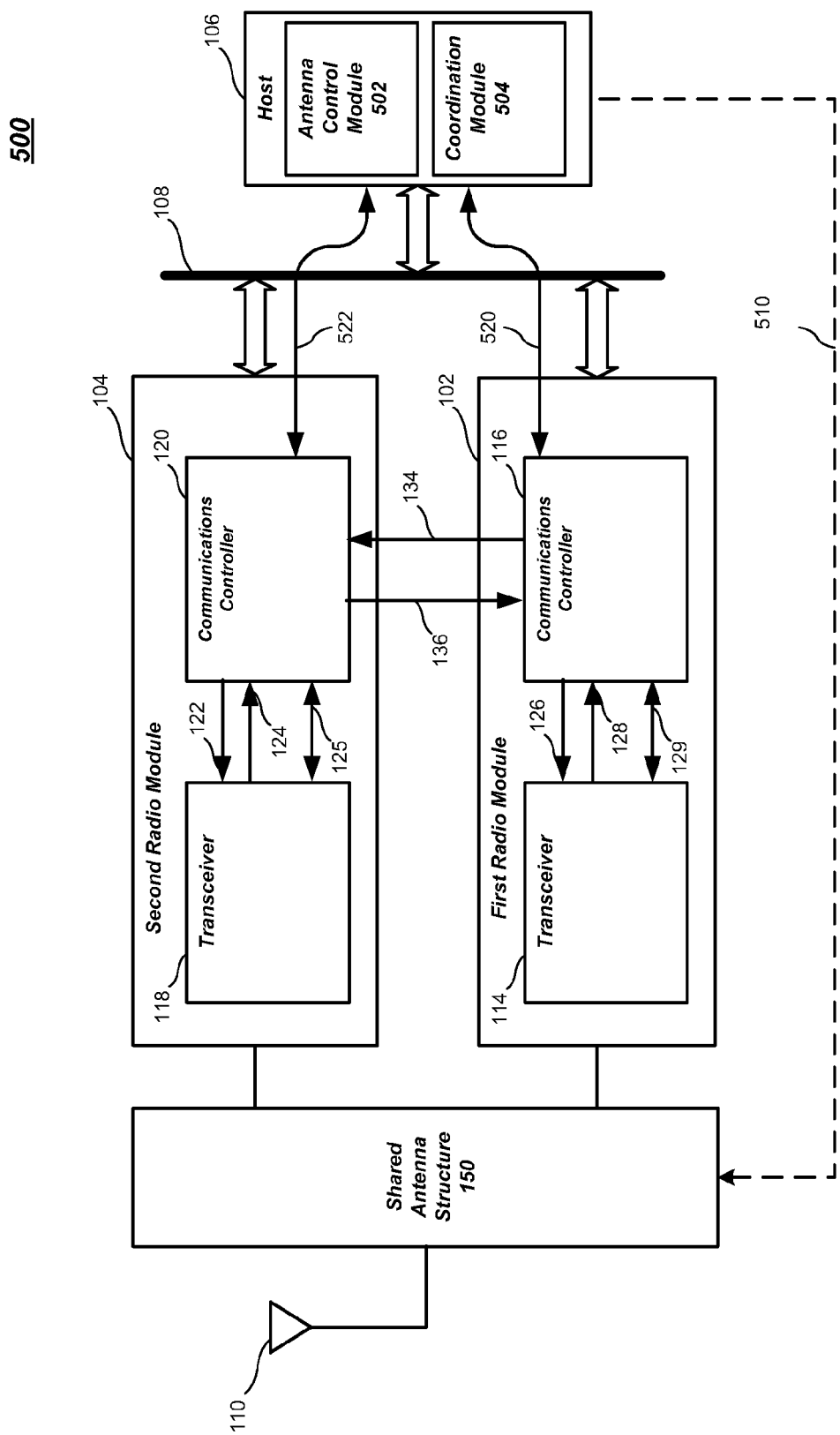
FIG. 5 illustrates one embodiment of a second apparatus.

FIG. 5 illustrates one embodiment of an apparatus 500. The apparatus 500 may be similar to the apparatus 100. In addition, the apparatus 500 may implement an antenna control module 502 and a coordination module 504. The antenna control module 502 and the coordination module 504 may be implemented in hardware, software, firmware, or in any combination thereof. For instance, features of modules 502, 504 may be implemented with instructions or logic (e.g., software) that is provided on a storage medium for execution by one or more processors. For such implementations, modules 502, 504 may each be implemented on a dedicated processor. Alternatively, a processor may be shared among modules 502, 504 (as well as among other elements). In the illustrated embodiment shown in FIG. 5, the antenna control module 502 and the coordination module 504 are implemented as software or firmware for the host processor 106. The antenna control module 502 or the coordination module 504 may be implemented by other processors, such as one or more communications controllers 116, 120, or a dedicated hardware or software controller for the shared antenna structure 150. The embodiments are not limited in this context.

In the illustrated embodiment shown in FIG. 5, the antenna control module 502 may be communicatively coupled to the shared antenna structure 150 either directly or indirectly via radio modules 102, 104. The antenna control module 502 may be operative to receive information representing activity for the first and second transceivers 114, 118, and arrange the shared antenna structure 150 for simultaneous operations or mutually-exclusive operations. The antenna control module 502 may receive activity information, and generate a control directive or control signal based on the activity information. The antenna control module 502 may passed the control directive or control signal directly to the shared antenna structure 150 via line 510, or indirectly to the shared antenna structure 150 via the radio modules 102, 104 and respective lines 520, 522.

In one embodiment, for example, the antenna control module 502 may be operative to receive information representing activity for the transceivers 114, 118, and arrange the shared antenna structure for simultaneous operations when both transceivers 114, 118 have a level of activity above a set of defined thresholds.

In one embodiment, for example, the antenna control module 502 may be operative to receive information representing activity for the first and second transceivers 114, 118, and arrange the shared antenna structure 150 for mutually-exclusive operations when one of the first or second transceivers 114, 118 have a level of activity above a defined threshold, and another of the first or second transceivers 114, 118 have a level of activity below a defined threshold.

In one embodiment, the defined thresholds for the transceivers 114, 118 may be the same. In another embodiment, the defined thresholds may be different thresholds for each radio, such as different parameters, different detection levels, and so forth.

Referring again to FIGS. 1 and 5, the radio modules 102, 104 may include respective communications controllers 116, 120 communicatively coupled to the respective transceivers 114, 118. The communications controllers 116, 120 may exchange information between their respective transceivers 114, 118. The communications controllers 116, 120 may also be operative to exchange information regarding operation of the transceivers 114, 118, and schedule operations for the transceivers 114, 118 based on the exchanged information. In this case, the communications controllers 116, 120 operate as peer elements. Additionally or alternatively, the communications controllers 116, 120 may be operative to exchange information with the coordination module 504. In this case, the coordination module 504 may operate as a master while the communications controllers 116, 120 operate as slaves to the coordination module 504.

The communications controllers 116, 120 may be implemented in hardware, software, firmware, or in any combination thereof. For instance, features of communications controllers 116, 120 may be implemented with instructions or logic (e.g., software) that is provided on a storage medium for execution by one or more processors. For such implementations, communications controllers 116, 120 may each include a dedicated processor (e.g., a baseband processor). Alternatively, such processors may be shared among controllers 116, 120 (as well as among other elements).

The communications controllers 116, 120 may control activities of a corresponding transceiver 114, 118. This may involve sending one or more directives to the corresponding transceiver. To provide such control, the communications controllers 116, 120 may include various logic, routines, and/or circuitry that operate on information received from other radio modules. In embodiments, one or more processors may execute such logic and routines.

Such control may involve scheduling the corresponding transceiver's transmit and receive activities. This scheduling may involve determining when transmissions should be limited or prohibited. For instance, communications controllers 116, 120 may prohibit its corresponding transceivers 114, 118 from transmitting signals based on information received from the other radio. An example of such information is an indication that another radio is currently receiving transmissions.

In embodiments, communications controllers 116, 120 may receive status data from the corresponding transceivers 114, 118. The status data may include various types of information. For instance, the status data may convey timing information. This may be in the form of clock or synchronization pulses. However, the status data may convey other information as well.

The communications controllers 116, 120 may exchange information with each other. This exchange may involve providing one or more radio modules 102, 104 with operational information. For instance, communications controllers 116, 120 may exchange notifications conveying information regarding the corresponding transceiver's activities or operational status. Status registers may be used to store variables and information regarding such activities or operational status. Based on such notifications, communications controllers 116, 120 may send associated messages or signals to each other. In addition, communications controllers 116, 120 may send control directives to the corresponding transceivers 114, 118 for appropriate action (if any). The communications controllers 116, 120 may employ various techniques to exchange information with each other. For example, the communications controllers 116, 120 may activate and/or detect activated signal lines. Such signal lines may be dedicated to particular signals. Alternatively, communications controllers 116, 120 may generate data messages to be transmitted across various connections. Exemplary connections may include a parallel interface, a serial interface, a bus interface, and/or a data network.

Coordination module 504 may control operations of transceivers 114, 118. This may include scheduling transmission and reception activity for transceivers 114, 118. Such control may be based on operational status of transceivers 114, 118. Control and coordination of transceivers may involve the exchange of information between coordination module 504 and the communication controllers of each radio module 102, 104. For instance, FIG. 5 shows coordination module 504 exchanging information via line 520 with communications controller 116 and information via line 522 with communications controller 120.

This information may include status data sent to coordination module 504. Such status data may originate as operational status information provided by transceivers 114, 118. Further, this information may include commands sent to communications controllers 116, 120. In turn, these communications controllers may forward associated control directives to transceivers 114, 118, respectively. The information may be implemented as signals allocated to various signal lines, data messages, and so forth. This information may be sent across various interconnection medium 108 or alternative connections.

Figure 6:
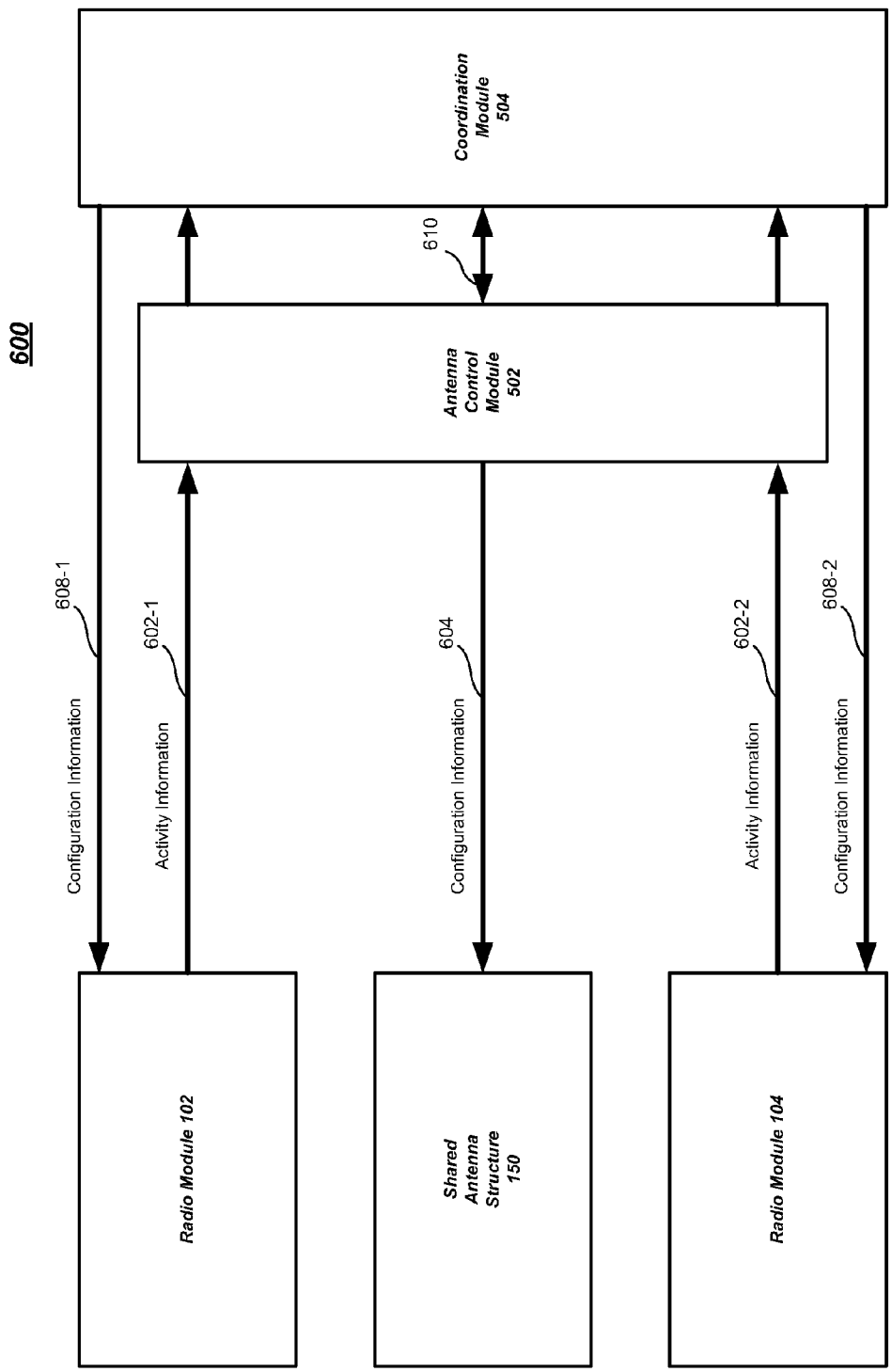
FIG. 6 illustrates one embodiment of an antenna control module.

FIG. 6 is a diagram 600 illustrating exemplary coordination that may be performed by antenna control module 502, radio modules 104, 102, and the shared antenna structure 150. As shown in FIG. 6, radio modules 102, 104 may send activity information 602-1, 602-2 to the antenna control module 502. Antenna control module 502 may generate and send configuration information 604 to the shared antenna structure 150 based on the activity information 602-1, 602-2. The configuration information 604 may indicate whether the shared antenna structure 150 is placed in a simultaneous mode or a mutually-exclusive mode. The configuration information 604 may be in the form of a control signal or message.

Diagram 600 also illustrates exemplary coordination that may be performed by coordination module 504 and the radio modules 102, 104. The coordination module 504 may be operative to receive information regarding operation of the transceivers 114, 118, and schedule operations for the transceivers 114, 118 based on the received information. As shown in FIG. 6, antenna control module 502 may forward activity information 602-1, 602-2 to the coordination module 504. Additionally or alternatively, the radio modules 102, 104 may exchange information directly with the coordination module 504 via the lines 520, 522. The coordination module 504 may send coordination information 608-1, 608-2 to the respective radio modules 102, 104 based on the activity information 602-1, 602-2. For instance, coordination module 504 may delay, slow-down, or prevent one or both radio modules 102, 104 from transmitting wireless signals, among other options.

The antenna control module 502 and the coordination module 504 may also exchange information to affect performance of the radio modules 102, 104 and/or the shared antenna structure 150 via line 610. For instance, the antenna control module 502 and the coordination module 504 may exchange information to control how long the shared antenna structure 150 is in a simultaneous mode or a mutually-exclusive mode. Reducing an amount of time the shared antenna structure 150 is in a simultaneous mode reduces an amount of insertion loss caused by the combiner 204 of the antenna control module 150. This may provide a technical advantage under certain conditions.

An exemplary use scenario may include when the shared antenna structure 150 is arranged to operate in a simultaneous mode, but the quality of the wireless signals fall below a desired threshold for one or both transceivers 114, 118. In this case, the coordination module 504 may instruct one of the transceivers 114, 118 to delay or prevent operations, and instruct the antenna control module 502 to change the shared antenna structure from the simultaneous mode to a mutually-exclusive mode for one of the transceivers 114, 118. This reduces or obviates the insertion loss associated with the circuit elements providing the simultaneous mode, thereby making more power available to increase range, signal strength or quality. A selection of which of the transceivers 114, 118 to delay or prevent operation may be performed in accordance with any desired criterion, such as assigned priority levels, signal strengths, or quality for the respective transceivers 114, 118.

Another exemplary use scenario may include when the shared antenna structure 150 is arranged to operate in a simultaneous mode, but the quality of the wireless signals falls below a desired threshold for one or both transceivers 114, 118, or the level of activity requested by the user on one of them may preclude simultaneous mode, the coordination module 504 may re-direct the communications traffic to a different source. A specific, but not limiting, example of this would be when WLAN is in use for web-browsing/file transfer while using Bluetooth heavily, the coordination module 504 may re-direct the WLAN traffic to a cellular data network or other data network in a different, no co-located frequency band.

Another exemplary use scenario may include monitoring a power level for a battery. When a power level for the battery falls below a certain defined threshold, one or both of the transceivers may need to be turned off to conserve power. In this case, the coordination module 504 may instruct one of the transceivers 114, 118 to delay or prevent operations, and instruct the antenna control module 502 to change the shared antenna structure from the simultaneous mode to a mutually-exclusive mode for one of the transceivers 114, 118. This reduces or obviates the insertion loss associated with the circuit elements providing the simultaneous mode, thereby extending battery life for a mobile device.

These are merely a few exemplary use scenarios, and it may be appreciated that the antenna control module 502 and the coordination module 504 may exchange information and coordinate operations between the radio modules 102, 104 and the shared antenna structure 150 to further enhance performance of a wireless device. The embodiments are not limited to these examples.

The coordination module 504 may be operative to receive information regarding operation of the transceivers 114, 118, and schedule operations for the transceivers 114, 118 based on the received information. The radio modules 102, 104 may exchange information with the coordination module 504 via the lines 520, 522. The coordination module 504 may send coordination information 608-1, 608-2 to the respective radio modules 102, 104 based on the activity information 602-1, 602-2.

The shared antenna architecture described herein provides for effective simultaneous or mutually-exclusive use of one or more antennas by multiple co-located radios to facilitate co-existence between the multiple wireless transceivers. However, there are situations where the demand for communications resources is too great to provide sufficient access to both co-located radios, regardless of the type of antenna architecture used for the co-located radios. For instance, when one of the radio modules 102 is a WLAN device and the other radio module 104 is a Bluetooth device, situations may arise where either the WLAN communications with an access point degrades to the point that the access point disconnects the WLAN device from a network, and/or audio quality is perturbed to the point of being inaudible. Neither of these situations is considered acceptable for many use scenarios of a mobile computing device.

Radio Coordination Techniques

In a second set of embodiments, the enhanced co-existence techniques may further include various radio coordination techniques to improve co-existence operations for the co-located radio modules 102, 104. The radio coordination techniques may coordinate transmission and reception activity for the co-located radio modules 102, 104 to enhance performance of one or both radio modules 102, 104. In addition, one or more of the radio coordination techniques may be combined with one or more of the shared antenna techniques as previously described, in various combinations, and thereby further improve co-existence operations for a mobile computing device.

The coordination module 504 may implement various radio coordination techniques to improve co-existence operations for the radio modules 102, 104. Depending on a given radio coordination technique implemented by the coordination module 504, the coordination module 504 may send different types of coordination information 608-1, 608-2 to the respective radio modules 102, 104 based on the activity information 602-1, 602-2, as well as information regarding the communications environment for the radio modules 102, 104. For instance, the coordination information may comprise control directives in the form of coordination information 608-1, 608-2 (or other messaging structures) to modify one or more communications parameters for one or both of the radio modules 102, 104. Examples of communications parameters may include without limitation a fragmentation parameter, an aggregation parameter, a packet retry parameter, a rate selection parameter, a window size parameter, a frequency parameter, a clock speed parameter, a power parameter, a delay parameter, a received signal strength indicator (RSSI) level, and any other adjustable communications parameter for the radio modules 102, 104. Examples of radio coordination techniques may include without limitation spectrum channel masking techniques, data throughput limiting techniques, and probabilistic estimation techniques. Examples of data throughput limiting techniques may include without limitation clock speed limiting techniques, and window size control techniques. Other radio coordination techniques are possible consistent with the described embodiments. The embodiments are not limited in this context.

Spectrum Channel Masking Techniques

In various embodiments, the coordination module 504 may implement a spectrum channel masking technique. The spectrum channel masking technique essentially masks certain overlapping communications channels that may potentially cause interference for one or both of the radio modules 102, 104.

In one embodiment, for example, the first radio module 102 may be operative to communicate wirelessly across a first link using a first set of communications channels, and the second radio module 104 may be operative to communicate wirelessly across a second link using a second set of communications channels. In some cases, the first and second set of communications channels may both utilize a certain number of shared frequencies, thereby creating overlapping communications channels. In such cases, the coordination module 504 may be operative to receive activity information 608-1, 608-2 regarding operation of first and second radio modules 102, 104, select a set of masked channels using the shared frequencies based on the received activity information from the first and second radio modules 102, 104, and send a control directive in the form of coordination information 608-1 or 608-2 to at least one of the first and second radio modules 102, 104 to operate using one or more communications channels outside of the set of masked channels. The target radio module 102, 104 basically masks the communications channels identified in a respective set of masked channels. The first or second radio modules 102, 104 may then initiate or resume communications using one or more communications channels that are not included within the set of masked channels. The spectrum masking technique implemented by the coordination module 504 may be described in more detail with reference to FIGS. 7-11.

Figure 7:
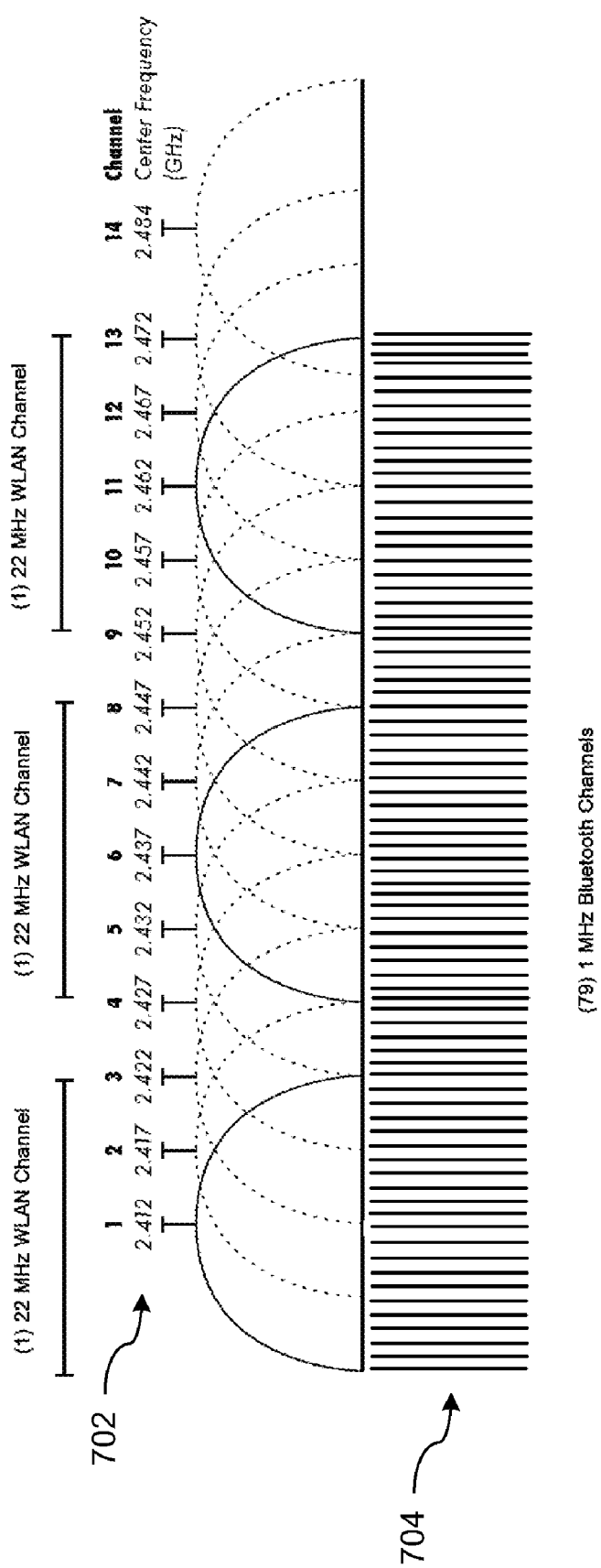
FIG. 7 illustrates a first diagram of overlapping communications channels.

FIG. 7 illustrates a diagram 700 illustrating overlapping communications channels. When the radio modules 102, 104 are implemented as respective WLAN and Bluetooth devices, both radios may share one or more of the industrial, scientific and medical (ISM) frequency bands, such as the 2.400-2.500 GHz frequency band, among others. As shown in FIG. 7, the radio module 102 may utilize a first set of communications channels 702, such as a set of 22 MHz WLAN channels 1-14, and the radio module 104 may utilize a second set of communications channels 704, such as a set of 1 MHz Bluetooth channels 1-79, with both sets using portions of the shared ISM frequency band. For example, the 22 MHz WLAN channel 1 has a center frequency of 2.412 GHz, which spans approximately the 1 MHz Bluetooth channels 1-20. This potentially causes problems for both reception and transmission of WLAN and Bluetooth frames and application packets.

Figure 8:
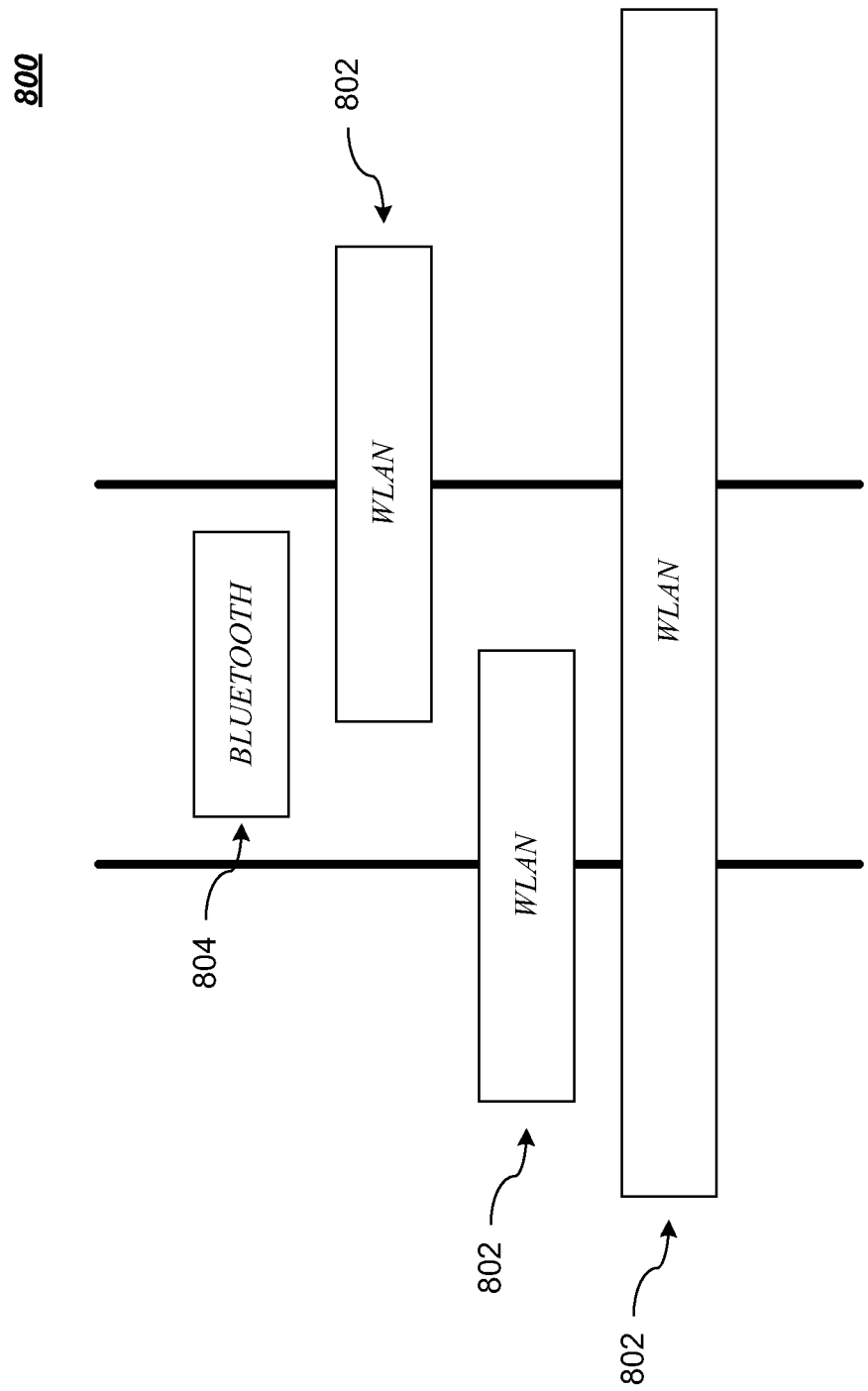
FIG. 8 illustrates a second diagram of overlapping communications channels.

FIG. 8 illustrates a diagram 800 illustrating overlapping communications channels in the time domain. As shown in diagram 800, the radio modules 102, 104 may communicate WLAN packets (or frames) 802 and Bluetooth packets (or frames) 804 at the same time using overlapping communications channels, thereby creating interference for the radio modules 102, 104.

In order to reduce or eliminate interference from the co-located radio modules 102, 104, the coordination module 504 may receive information regarding operation of first and second radio modules 102, 104 in the form of activity information 602-1, 602-2. The coordination module 504 may select a set of masked channels using the shared frequencies based on the received activity information from the first and second radio modules 102, 104. For example, both WLAN channel 1 and Bluetooth channels 1-20 use a 20 MHz spectrum of shared frequencies around the center frequency 2.412 GHz. Therefore, a set of masked channels for the radio module 102 could include WLAN channel 1, while a set of masked channels for the radio module 104 could include Bluetooth channels 1-20. In another example, WLAN channel 6 and Bluetooth channels 28-48 use a 20 MHz spectrum of shared frequencies around the center frequency 2.437 GHz. Therefore, a set of masked channels for the radio module 102 could include WLAN channel 6, while a set of masked channels for the radio module 104 could include Bluetooth channels 28-48.

Once the coordination module 504 selects a set of masked channels, it sends a control directive in the form of coordination information 608-1 or 608-2 to at least one of the first and second radio modules 102, 104 to operate using one or more communications channels outside of the set of masked channels. In other words, the first or second radio modules 102, 104 may receive the respective coordination information 608-1, 608-2 and mask out those channels identified by the set of masked channels. For example, if the coordination module 504 desires to reduce interference for the radio module 102, the coordination module 504 may send coordination information 608-2 to the radio module 104 to mask out and stop using a set of masked channels using shared frequencies with the radio module 102. Similarly, if the coordination module 504 desires to reduce interference for the radio module 104, the coordination module 504 may send coordination information 608-1 to the radio module 102 to mask out and stop using a set of masked channels using shared frequencies with the radio module 104. An example for a spectrum masking technique is illustrated in FIG. 9.

Figure 9:
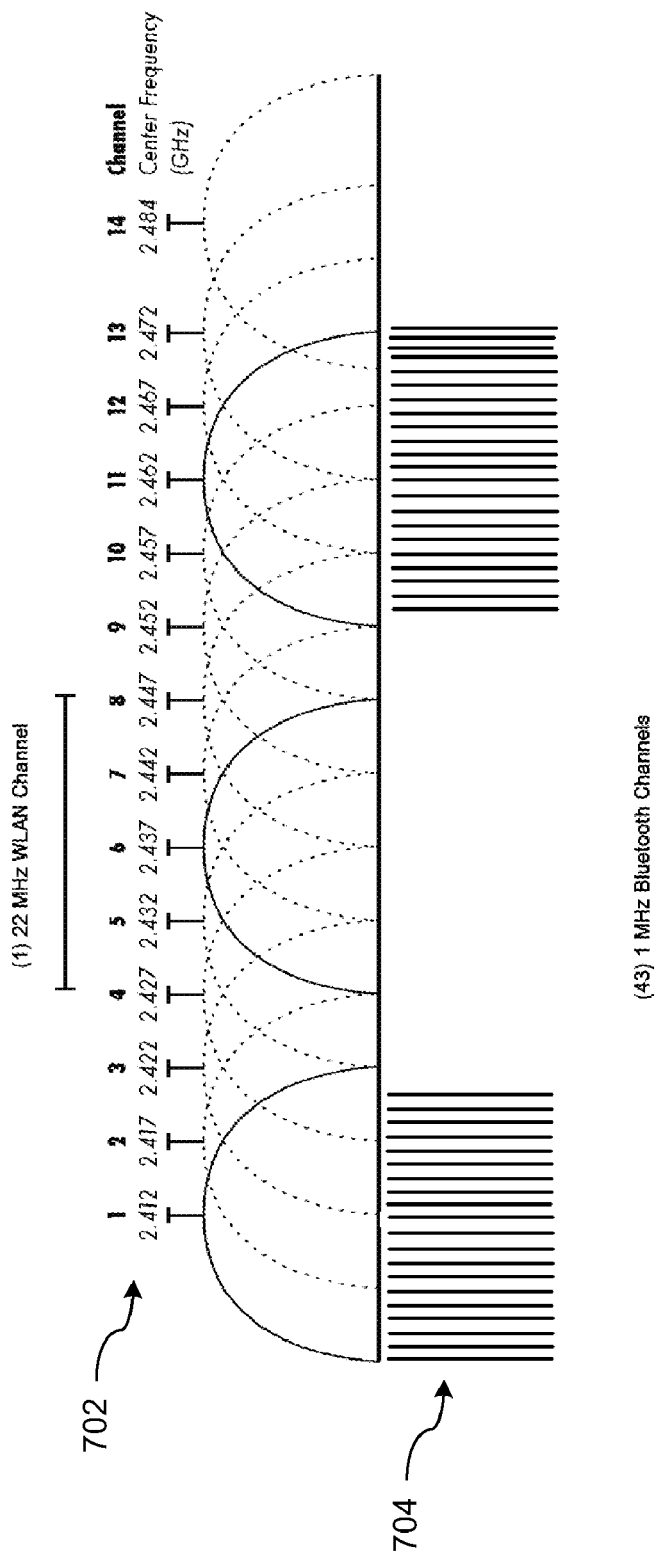
FIG. 9 illustrates a third diagram of overlapping communications channels.

FIG. 9 illustrates a diagram 900 of overlapping communications channels. The diagram 900 may be similar to the diagram 700 described with reference to FIG. 7. The diagram 900, however, illustrates a case where the coordination module 504 decides to increase performance for the radio module 102.

The coordination module 504 may be operative to select a set of masked channels based on a communications channel used by the first or second radio modules 102, 104. Assume the coordination module 504 receives activity information 602-1, 602-2 from the respective radio modules 102, 104 indicating that radio modules 102, 104 are both engaged in active communications sessions with different remote devices. The activity information 602-1 indicates that the radio module 102 is using a first set of communications channels 702 that includes WLAN channel 6. The activity information 602-2 indicates that the radio module 104 is using (or can use) a second set of communications channels 704 that includes the Bluetooth channels 28-48.

The coordination module 504 may select a set of masked channels using the shared frequencies based on the received activity information 602-1, 602-2 from the first and second radio modules 102, 104. For instance, WLAN channel 6 and Bluetooth channels 28-48 use a 20 MHz spectrum of shared frequencies around the center frequency 2.437 GHz. Therefore, a set of masked channels for the radio module 102 would include WLAN channel 6, while a set of masked channels for the radio module 104 would include Bluetooth channels 28-48.

Assuming that the coordination module 504 decides that the radio module 102 needs an increase in performance based on a desired set of criteria or policies, the coordination module 504 may send coordination information 608-2 to the radio module 104 instructing the radio module 104 to mask out and stop using Bluetooth channels 28-48 which utilize the same set of frequencies as WLAN channel 6. In this manner, the radio interference caused by transmitting and receiving information by the radio module 104 over the Bluetooth channels 28-48 will be reduced or eliminated, thereby increasing performance for the radio module 102 using the WLAN channel 6.

The coordination module 504 may select a set of masked channels centered on a center frequency for a communications channel used by the first or second radio module 102, 104. As with the previous example described with reference to diagram 900, the coordination module 504 may select the set of masked channels based on a center frequency of one or more communications channels used by the first radio module 102, such as center frequency 2.437 GHz for the WLAN channel 6. Once the coordination module 504 determines the center frequency for WLAN channel 6, the coordination module 504 may select a certain number of masked channels based on a spectrum range around the center frequency 2.437 GHz. For example, the coordination module 504 may select a set of masked channels in a 20 MHz range around the center frequency 2.437 GHz, which includes the Bluetooth channels 28-48.

In some cases, the coordination module 504 may be configured to include additional spectrum range beyond the shared frequencies, such as for a guard band. Continuing with the previous example, assume the coordination module 504 is configured to select a 16 MHz guard band beyond the 20 MHz range, thereby making the total spectrum range 36 MHz around the center frequency of 2.437 GHz. The additional 16 MHz of guard band may be used, for example, to ensure the many of the harmonics do not overlap as well as the actual channel frequency. In this case, a set of masked channels in a 36 MHz range around the center frequency 2.437 GHz may include Bluetooth channels 20-54. The spectrum range may be set in accordance with any number of design criteria, including those set by a user, determined a priori or dynamically using statistical analysis, vary dynamically based on operations of the radio modules 102, 104, and other desired criteria. The coordination module 504 may send coordination information 608-2 to the radio module 104 instructing the radio module 104 to mask out and stop using Bluetooth channels 20-54 which utilize the same set of frequencies as WLAN channel 6 plus a 16 MHz guard band around the 20 MHz WLAN channel 6. The radio module 104 may then select a communications channel outside of the set of masked channels, such as the Bluetooth channels 1-19 or 55-79, for Bluetooth transmissions.

Figure 10:
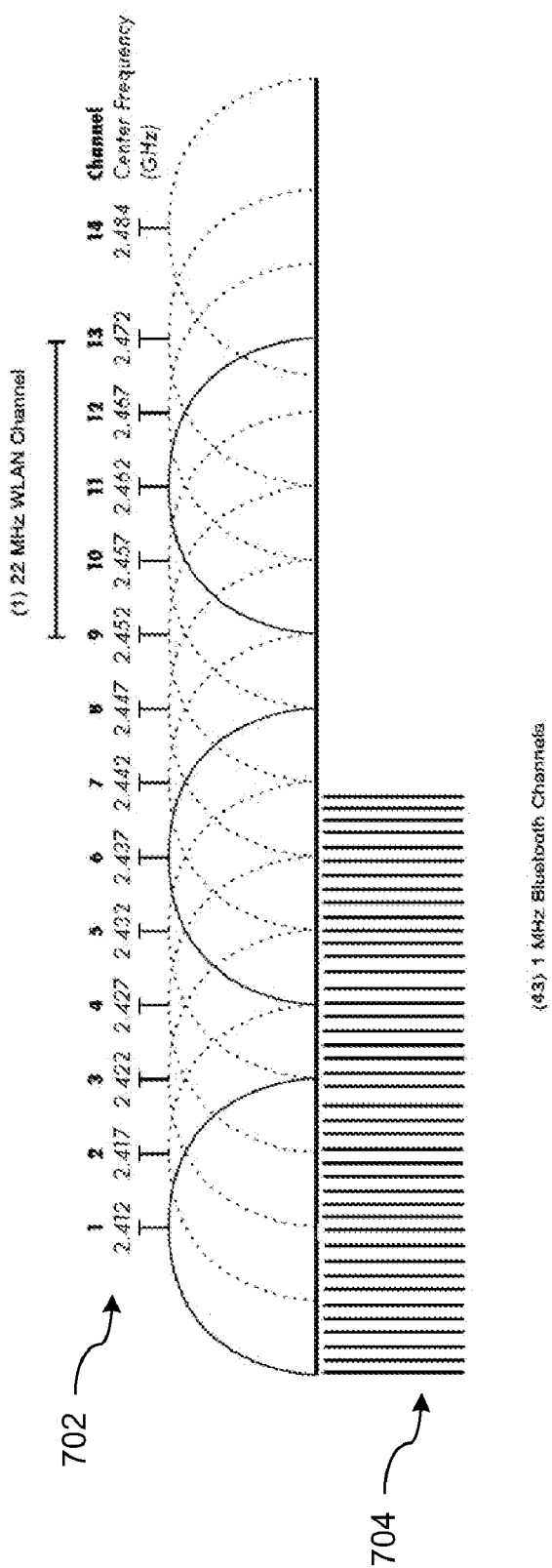
FIG. 10 illustrates a fourth diagram of overlapping communications channels.

FIG. 10 illustrates a diagram 1000 of overlapping communications channels. The coordination module 504 may modify a set of masked channels when the first or second radio module 102, 104 switches to a different communications channel. For example, assume the coordination module 504 receives activity information 602-1 from radio module 102 indicating that radio module 102 has switched from the WLAN channel 6 to the WLAN channel 11 having a new center frequency of 2.462 GHz. The coordination module 504 may select a new set of masked channels for the radio module 104 in response to the change in communications channel by the radio module 102. For example, the coordination module 504 may select Bluetooth channels 59-79 (and possible guard bands) for the set of masked channels. The coordination module 504 may send coordination information 608-2 to the radio module 104 instructing the radio module 104 to mask out and stop using Bluetooth channels 59-79 which utilize the same set of frequencies as WLAN channel 11. The radio module 104 may then select and use a communications channel from among the Bluetooth channels 1-58.

The coordination module 504 may receive various types of activity information 602-1, 602-2. For instance, the activity information 602-1, 602-2 may provide information about a certain traffic type, a priority level or a direction for the first radio module 102 or the second radio module 104. The coordination module 504 may then select a set of masked channels based on the different types of information. For example, the coordination module 504 may use the activity information 602-1, 602-2 to determine which of the radio modules 102, 104 need increased or decreased performance, and by what level, and then select the appropriate masked channels for the radio module 102 or the radio module 104. The coordination module 504 may also select a spectrum range around a given center frequency based on the activity information, with a smaller spectrum range providing lower performance gains and a larger spectrum range generally providing higher performance gains. Examples of traffic type may include synchronous or asynchronous traffic, continuous or burst traffic, level of traffic load, and other traffic characteristics. Examples of priority level may include various Quality of Service (QoS) parameters providing different priority levels to different applications to guarantee a certain level of performance to a data flow. Examples of direction may include transmit or receive directions. Other types of activity information may be used to select a set of masked channels.

Figure 11:
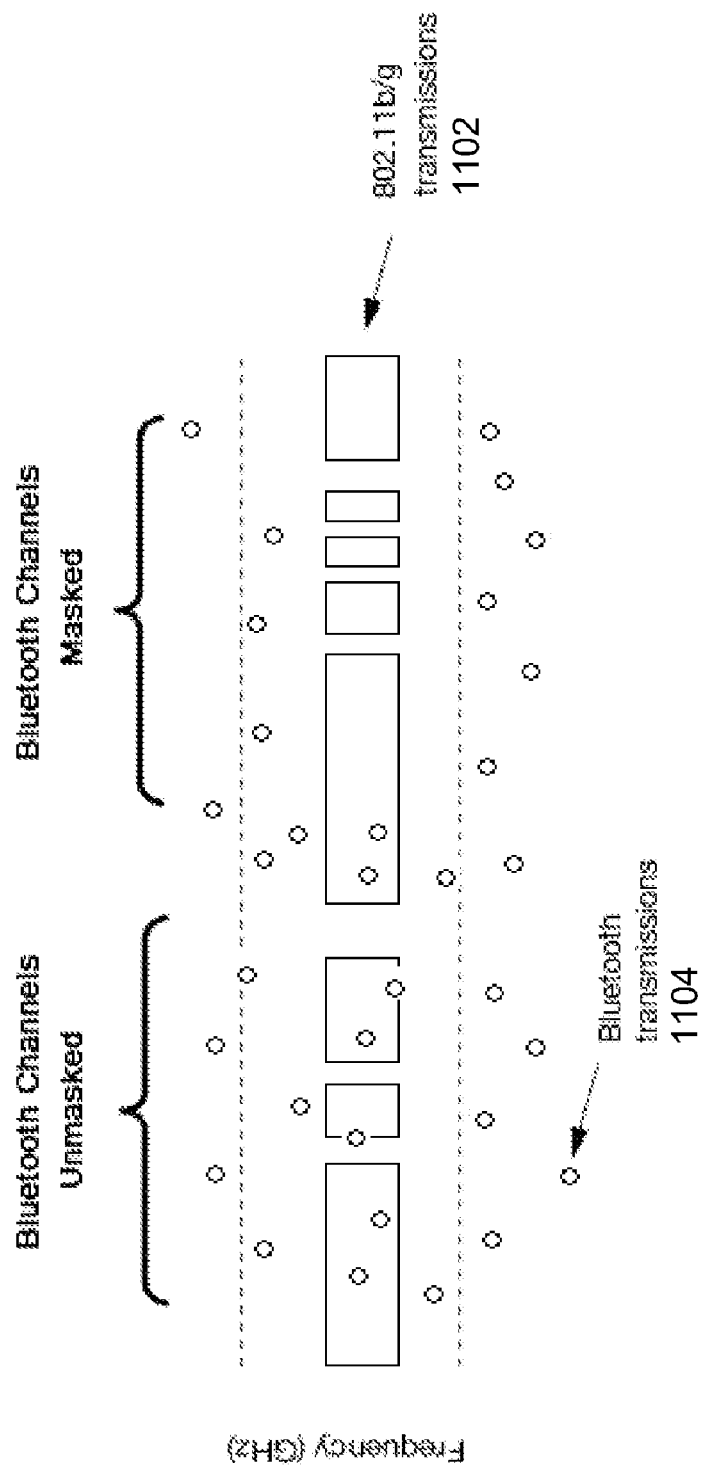
FIG. 11 illustrates a fifth diagram of overlapping communications channels.

FIG. 11 illustrates a diagram 1100 of overlapping communications channels. More particularly, the diagram 1100 shows the frequency and time domains of the overlapping and masked channel transmissions. As shown in the diagram 1100, when the radio module 102 is engaged in 802.11 transmissions 1102 with the overlapping communications channels used for Bluetooth transmissions 1104 unmasked, there is a greater number of Bluetooth transmissions 1104 in the shared frequencies used by the radio modules 102, 104, thereby degrading performance for the radio module 102. When the Bluetooth transmissions 1104 are masked, however, there are fewer Bluetooth transmissions 1104 in the shared frequencies used by the radio modules 102, 104, thereby enhancing performance for the radio module 102.

The spectrum masking technique provides significant technical advantages over conventional techniques. For example, Bluetooth radios may utilize adaptive frequency hopping (AFH) to avoid certain Bluetooth channels. The use of AFH, however, is undesirable for a number of reasons. For example, AFH takes a few seconds to sense the interference, average it with the results from other hops to the same frequency. During this delay there is a perturbation of the overlapping transmissions. Also AFH and the channels it picks for avoidance can change with outside interferers without regard to activity from co-located radios. This is unsuitable when attempting to enhance performance of co-located radios.

The spectrum masking technique utilizes a variation of AFH but immediately limits the usable channel list to not include the co-located WLAN radio active channel and the guard band around it. The spectrum masking technique enhances AFH by immediately masking out the overlapping spectrum on which the co-located WLAN radio is actively receiving and transmitting. There is no lag and the channel mask is preserved even when external interference sources cause interference on the active Bluetooth channels. Additionally, knowledge of the type of WLAN deployment can be used to influence the decisions made in how and what channels to block, and to other methods of co-existence improvements. For example, if the WLAN sub-system detects a density of access points in a corporate network, on a plurality of channels, the channel masking algorithm could make a selection of a WLAN channel to maximally avoid Bluetooth channels. Techniques for determining a type of network deployment using statistical inference is presented in a later section discussing probabilistic estimation techniques described with reference to FIGS. 15-17.

Data Throughput Limiting Techniques

The coordination module 504 may also utilize a number of different data throughput limiting techniques to improve coexistence between the radio modules 102, 104. The data throughput limiting techniques intentionally increasing or decreasing data throughput for one or both of the radio modules 102, 104 in order to improve coexistence between the radio modules 102, 104. In one embodiment, for example, the coordination module may reduce an amount of WLAN throughput for the radio module 102 to improve Bluetooth performance of the radio module 104. The amount of the reduction of the WLAN throughput should neither cause disconnection from a WLAN access point nor cause significant inconvenience to the user. To reduce the affect on WLAN and Bluetooth performance even further, knowledge of the quality and type of WLAN deployment can be used to adjust the amount of throughput reduction, as discussed in more detail with the probabilistic estimation techniques described with reference to FIGS. 15-17.

The coordination module 504 may receive activity information 602-1, 602-2 regarding operation of the first and second radio modules 102, 104, and send a control directive via coordination information 608-1, 608-2 to increase or decrease a data rate or data throughput for the first or second radio module 102, 104 based on the received information. The data rate may be increased or decreased utilizing various clock speed limiting techniques, window size control techniques, or modifying other communications parameters associated with the radio modules 102, 104.

Clock speed limiting techniques attempt to reduce a clock speed for various components in the data flow between an application and the radio modules 102, 104. In one embodiment, for example, the coordination module 504 may issue control directives via coordination information 608-1, 608-2 to reduce a clock speed for a communications interface between one or both controllers 116, 120 of the respective radio modules 102, 104 and the host processor 106. In another embodiment, for example, the coordination module 504 may issue control directives via coordination information 608-1, 608-2 to reduce clock speed for one or both controllers 116, 120, the host processor 106, or other hardware components using clocking or timing signals affecting data throughput for a device.

In one embodiment, for example, the coordination module 504 may receive activity information 602-1, 602-2 regarding operation of the first and second radio modules 102, 104, and send control directives via coordination information 608-1, 608-2 to reduce a clock speed for a communications interface between one or both controllers 116, 120 of the respective radio modules 102, 104 and the host processor 106 based on the received activity information 602-1, 602-2. Exemplary communications interfaces include interconnection medium 108. Interconnection medium 108 provides for couplings among elements, such as first radio module 102, second radio module 104, and host processor 106. Thus, interconnection medium 108 may include, for example, one or more bus interfaces. Exemplary interfaces include Universal Serial Bus (USB) interfaces, Serial Peripheral Interconnect (SPI) interfaces, Secure Digital Input Output (SDIO) interfaces, universal asynchronous receiver/transmitter (UART) interfaces, as well as various computer system bus interfaces. Additionally or alternatively, interconnection medium 108 may include one or more point-to-point connections (e.g., parallel interfaces, serial interfaces, etc.) between various element pairings.

In one embodiment, for example, the communications interface may comprise a SDIO interface, among others. The SDIO interface between the host processor 106 and the WLAN communications processor (e.g., controller 116) typically runs at a fixed clock speed, such as 25 MHz or 50 MHz. Reducing the bus clock speed from 50 MHz to 25 MHz, or 25 MHz to lower speeds, has the effect of reducing WLAN data throughput to and from the WLAN communications processor (e.g., controller 116).

Reducing WLAN data throughput potentially improves performance of the radio module 104 by giving more time to Bluetooth frames and packets and audio data to be transferred thus improving audio quality. In a higher density WLAN deployment, as determined using a probably density technique discussed later, the clock rate could be further reduced and still maintain acceptable levels of WLAN data throughput while allowing more time for Bluetooth operations. Consequently, the user would notice less affect on the Bluetooth performance.

Reducing WLAN data throughput by reducing clock speeds for a communications interface between the host processor 106 and the controller 116, for example, also saves power thereby extending battery life, and reduces thermal emissions from both the host processor 106 and the controller 116.

In one embodiment, for example, the coordination module 504 may issue control directives via coordination information 608-1, 608-2 to reduce clock speed for one or both controllers 116, 120, the host processor 106, or other hardware components using clocking or timing signals affecting data throughput for a device. For example, the coordination module 504 may receive activity information 602-1, 602-2 regarding operation of the first and second radio modules 102, 104, and increase or decrease a clock speed for the first or second controller 116, 120 based on the received information. For example, adjusting a clock speed of the controller 116 for WLAN communications can speed up or slow down the throughput of data packets to and from the controller 116. Slowing down a clock speed for the controller 116 for WLAN communications improves performance by giving more time to the radio module 104 to process Bluetooth frames and packets and audio data to be transferred thus improving audio quality. In a similar technique to reducing clock speed for a communications interface, knowledge of the density of the WLAN deployment can be used to adjust the amount of clock speed change for the controllers 116, 120.

The choice to modify data throughput is made by the coordination module 504 based on inputs from the radio modules 102, 104. These inputs provide information about the type of traffic, priority level and direction. That information is taken into consideration and coordination module 504 makes the necessary changes to the configuration for one or both controllers 116, 120. This technique also saves power and reduces thermal emissions from the controllers 116, 120.

Figure 12:
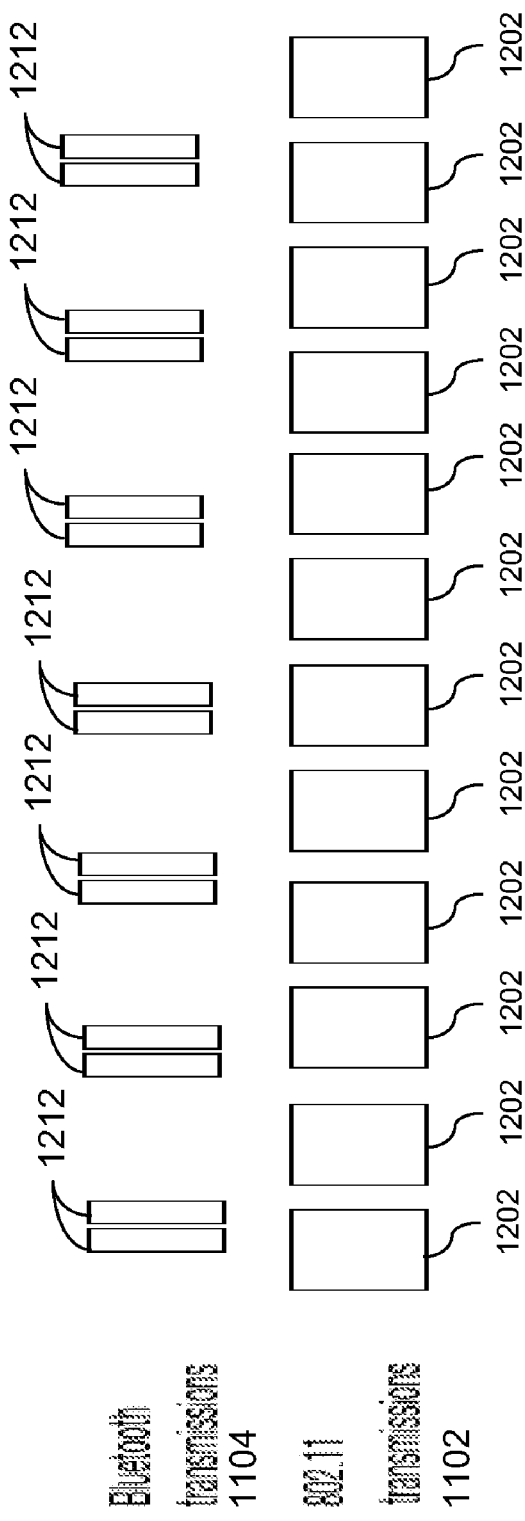
FIG. 12 illustrates a first diagram of relative packet throughput.

FIG. 12 illustrates a diagram 1200 of relative packet throughput. As shown in the diagram 1200, the radio module 102 and corresponding communications interface may operate at a first clock speed thereby producing a higher number of 802.11 transmissions 1102 of WLAN packets 1202 that coincide with Bluetooth transmissions 1104 of Bluetooth packets 1212 produced by the radio module 104. This represents a typical co-existence problem with potential interference between transmissions 1102, 1104 of the respective radio modules 102, 104.

Figure 13:
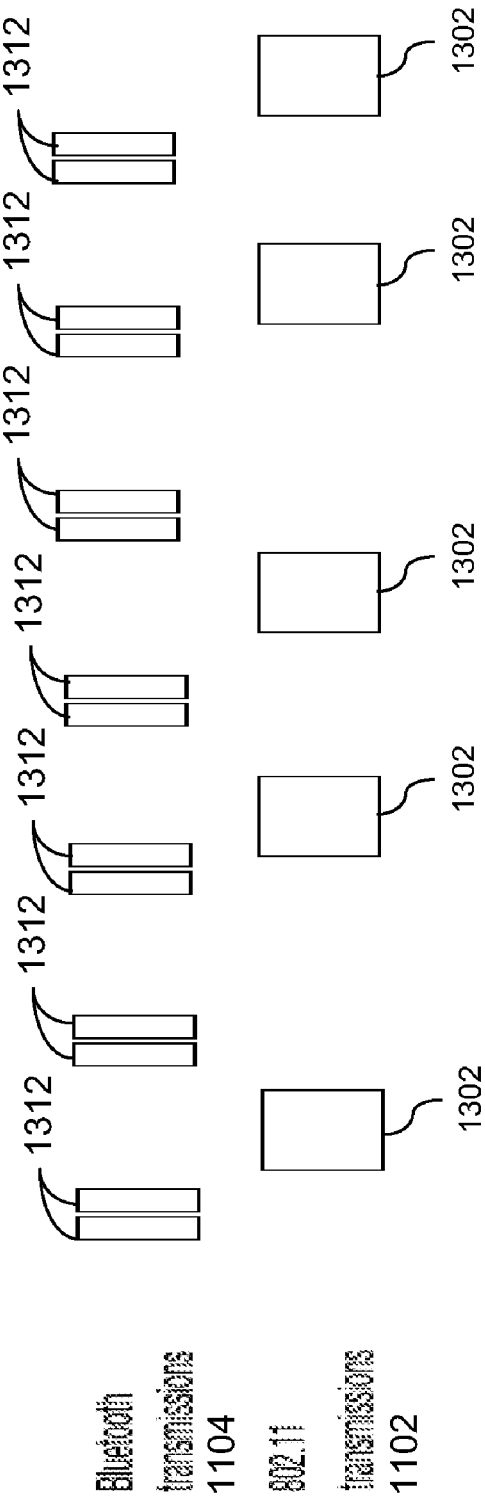
FIG. 13 illustrates a second diagram of relative packet throughput.

FIG. 13 illustrates a diagram 1300 of relative packet throughput. As shown in the diagram 1300, the radio module 102 may operate at a second clock speed that is lower than the first clock speed thereby producing a lower number of WLAN packets 1302 for 802.11 transmissions 1102 produced by the radio module 102 that coincide with Bluetooth packets 1312 for Bluetooth transmissions 1104 produced by the radio module 104. As a result, radio interference for the radio module 104 is reduced and performance for the radio module 104 is increased.

The coordination module 504 may also increase or decrease a data rate for the radio modules 102, 104 by utilizing window size control techniques. In one embodiment, for example, the coordination module 504 may receive activity information 602-1, 602-2 regarding operation of the first and second radio modules 102, 104, and send a control directive via coordination information 608-1, 608-2 to increase or decrease a window size for a communications protocol used by the first or second radio module 102, 104 based on the received activity information 602-1, 602-2.

In one embodiment, for example, the communications protocol may comprise an Internet protocol defined by the Internet Engineering Task Force (IETF), such as the transmission control protocol (TCP) Internet Protocol (IP) (TCP/IP), among others. The coordination module 504 controls this fundamental construct in TCP/IP data traffic, and negotiates the number of bytes that are allowed to be outstanding before the other end of the socket must acknowledge the successful receipt of the data bytes. The TCP/IP protocol can use sliding window acknowledgements (ACKS) to manipulate the data throughput. The coordination module 504 takes advantage of this capability of TCP/IP and slows down the throughput by requiring that ACKS be sent more often or for fewer outstanding data bytes. This may seem counter intuitive to the usual goal of increasing WLAN throughput using fewer ACKS, but this feature can be used to enhance co-existence for the radio modules 102, 104.

The coordination module 504 may decide to lower data throughput based on inputs from the radio modules 102, 104. These inputs provide information about the type of traffic, its priority and direction. In a similar method to the clock speed limiting techniques, knowledge of the density of the WLAN deployment can be used to adjust the amount of window size control. In a high density deployment, the data rates in use are likely higher than in a low density deployment. Higher data rates can send the same data in less time, or more precisely more data in the same amount of time, such that the TCP window could be larger and still not interfere with Bluetooth transmissions 1104. Conversely in a lower density deployment, the TCP window size would have to be smaller to achieve the desired time sharing between the radio modules 102, 104. The gaps in time that the smaller TCP/IP window size creates provide more time for Bluetooth frames and packets and audio data to be transferred thus improving audio quality for the Bluetooth transmissions 1104.

The coordination module 504 may increase or decrease a data rate for the first or second radio module 102, 104 based on activity information 602-1, 602-2 by modifying other communications parameters for the first or second radio module 102, 104. For example, the coordination module 504 may send control directives to modify WLAN transmissions by modifying WLAN modulation (and retries) and WLAN fragmentation (and aggregation), among other communications parameters.

There are situations when the WLAN transmissions should be constructed to fit within the idle time slots of the Bluetooth communications. This can be done by limiting the WLAN transmission times using specific rate and frame sizes. The radio module 102 performing WLAN communications usually come with predetermined rate selection algorithms based on signal strength of the signal received from an access point, over the air retry counts, Signal to Noise Ratio (SNR) or other link quality metrics. WLAN transmission times can be decreased by increasing the WLAN transmission modulation or transmission rate that is used by the radio module 102 to transmit outbound frames. WLAN transmission times can also be decreased by fragmenting the data packets into smaller frames or fragments. Fragmentation is a standard part of WLAN specifications. The coordination module 504, however, uses fragmentation in a unique manner. WLAN transmissions of multiple packets can be aggregated into one larger transmit opportunity in protocols like 802.11n. WLAN transmission times could again be decreased by suspending frame aggregation and reducing any single transmission time during periods of Bluetooth co-existence. The combination of WLAN transmission modulation and WLAN fragmentation can be adjusted to insure that the WLAN transmission times fit within the idle time slots of the Bluetooth communications.

Figure 14A:
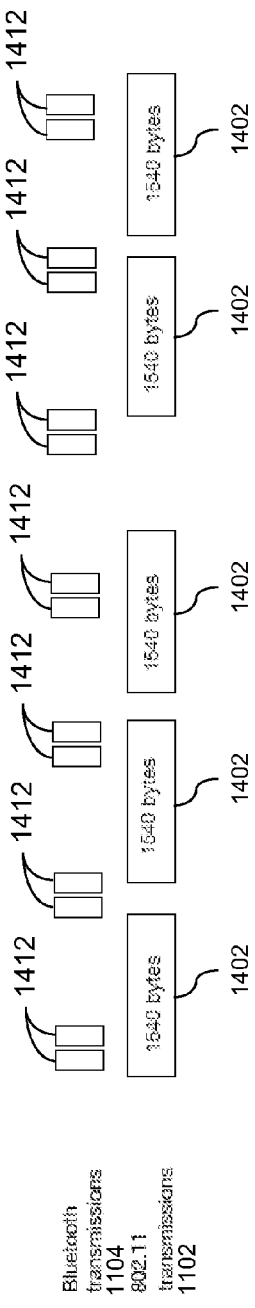
FIG. 14A illustrates a third diagram of relative packet throughput.

FIG. 14A illustrates a diagram 1400 of relative packet throughput. As shown in diagram 1400, the radio module 102 utilizes a frame size of 1540 bytes for 802.11 transmissions 1102 of WLAN packets 1402 that coincide with Bluetooth packets 1412 of Bluetooth transmissions 1104.

Figure 14B:
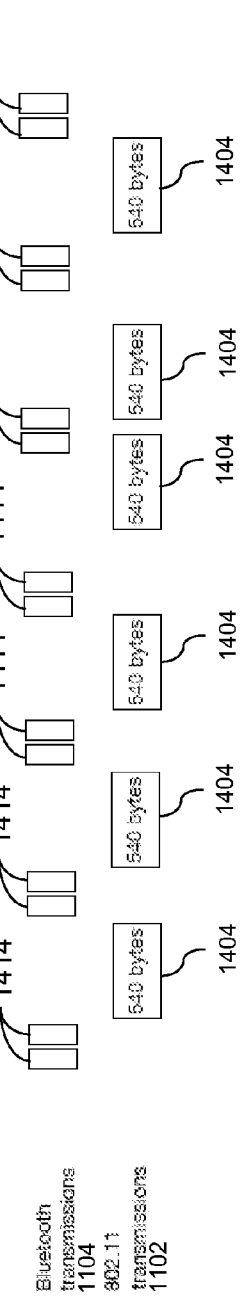
FIG. 14B illustrates a fourth diagram of relative packet throughput.

FIG. 14B illustrates the diagram 1400 of relative packet throughput utilizing fragmentation to reduce a frame size for the WLAN packets. For instance, the WLAN packets 1402 may be fragmented from a frame size of 1540 bytes to 540 bytes to form WLAN packet fragments 1404. The smaller frame size of WLAN packet fragments 1404 allows the WLAN packet fragments 1404 to fit within idle time slots between transmissions of the Bluetooth packets 1414. This reduces interference for both of the radio modules 102, 104.

Figure 14C:
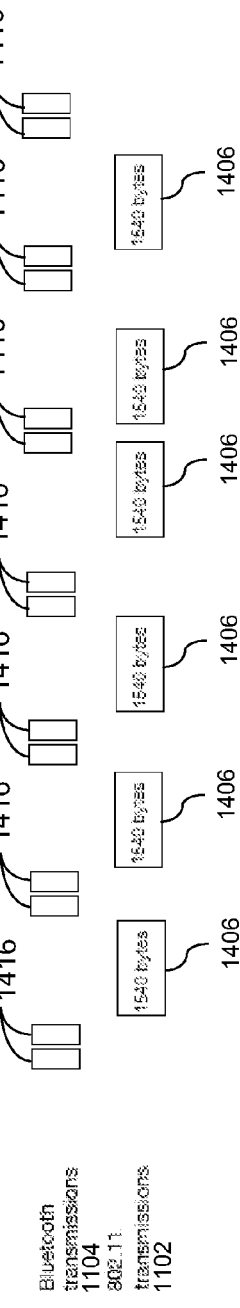
FIG. 14C illustrates a fifth diagram of relative packet throughput.

FIG. 14C illustrates the diagram 1400 of relative packet throughput utilizing rate transmissions to reduce interference for the radio modules 102, 104. For instance, the WLAN packets 1406 may have a frame size of 1540 bytes. A transmission rate for the radio module 102, however, may be modified so that the WLAN packets 1406 fit within idle time slots between transmissions of the Bluetooth packets 1416. This reduces interference for both of the radio modules 102, 104.

The choice to shorten WLAN transmission times is made by the coordination module 504 based on inputs from the radio modules 102, 104. These inputs provide information about the type of traffic, its priority and direction. Knowledge of the density of the WLAN deployment can be used to adjust the amount of induced packet fragmentation. In a high density deployment, the data rates in use are likely higher than in a low density deployment. Higher data rates can send the same data in less time, or more precisely more data in the same amount of time, such that the WLAN packet fragments 1404 could be larger and still not interfere with Bluetooth packets 1414. Conversely in a lower density deployment, the WLAN packet fragments 1404 would have to be smaller to achieve the desired time sharing between the radio modules 102, 104.

The coordination module 504 may receive density information for a communications environment for the first or second radio module 102, 104, and determine a control directive to modify a communications parameter for the first or second radio module 102, 104 based on the density information. In one embodiment, for example, the coordination module 504 may utilize a probability density function associated with the density information to select and modify the communications parameter. Examples of communications parameter may include without limitation a fragmentation parameter, an aggregation parameter, a packet retry parameter, a rate selection parameter, a window size parameter, a frequency parameter, a clock speed parameter, a power parameter, a delay parameter, and a RSSI level, among others. The embodiments are not limited in this context.

Choosing optimized wireless communications parameters including co-existence configurations is facilitated by the creation of models of the WLAN environment based on different topologies and densities of access points over different areas. The WLAN environment models are comprised of discrete states including for example low and high density AP deployments. Additional states also exist.

Figure 15:
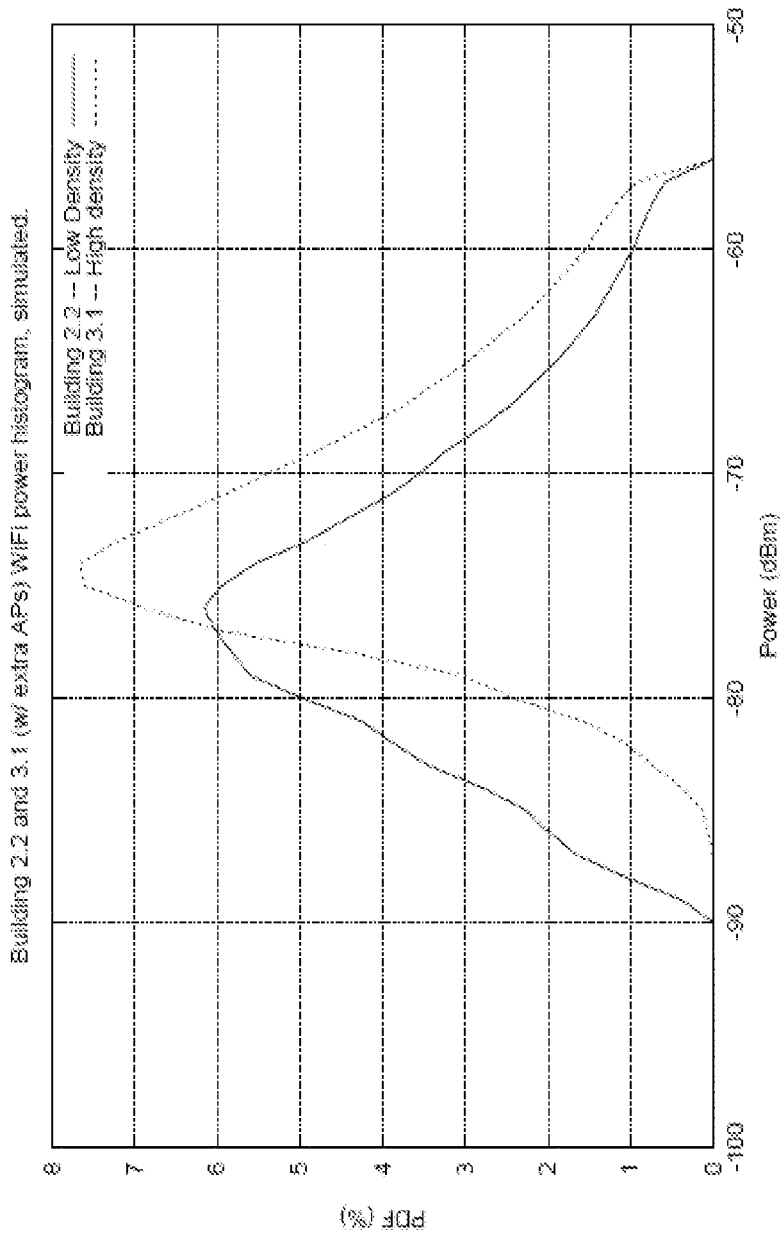
FIG. 15 illustrates a diagram of a power histogram.

FIG. 15 illustrates a diagram 1500 of a power histogram. FIG. 15 illustrates the diagram 1500 of simulated power histograms for two buildings having different topologies and densities of access points in different areas. More particularly, FIG. 15 illustrates power versus probably density function for a Building 2.2 and a Building 3.1. As illustrated, Building 2.2 may comprise low density and Building 3.1 may comprise high density.

In various embodiments, wireless environments, such as the environment illustrated in FIG. 15, may be modeled, for example, through simulation and by actively and passively scanning networks known to be low and high density access point deployments. The simulations may include, in some embodiments, placement of access points on a grid and then iterating standard path loss formulas to generate tables of signal strengths per access point at different locations. In some embodiments, this type of scanning may be performed at large companies, metropolitan networks, personal networks, public hotspots or different buildings both indoors and outdoors or any other location where a plurality of access points are known to exist.

Figure 16:
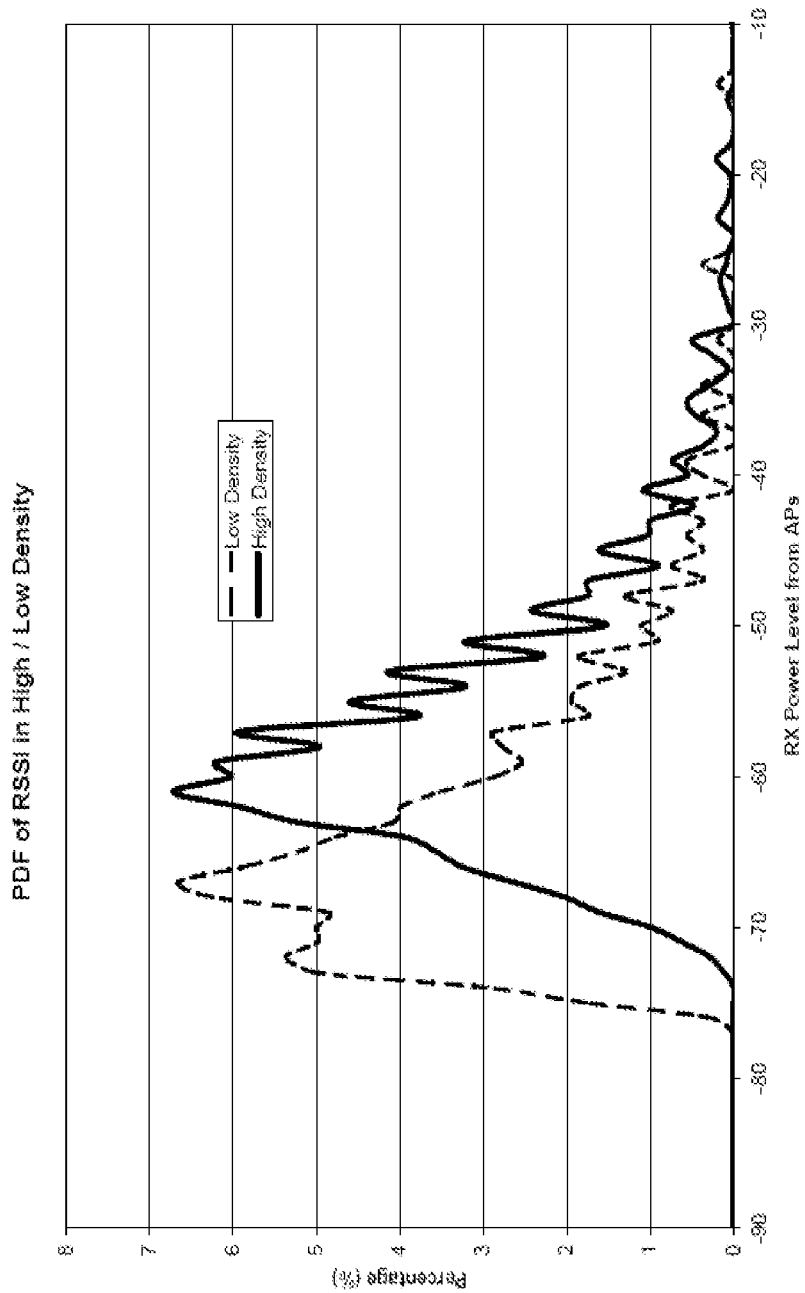
FIG. 16 illustrates a diagram of density chart.

FIG. 16 illustrates a diagram 1600 of density chart. FIG. 16 illustrates the diagram 1600 of a probability density function of Received Signal Strength Indicator (RSSI) in high and low density access point deployments. The horizontal axis of the graph shows a received power level from an access point and the vertical access illustrates a percentage.

Figure 17:
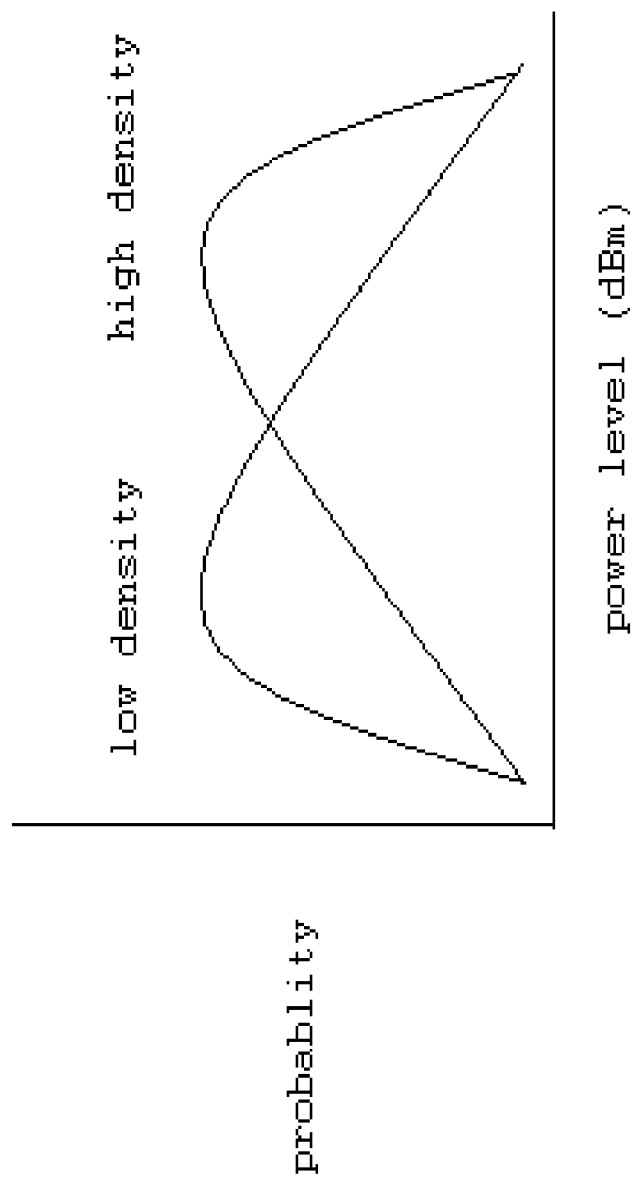
FIG. 17 illustrates a diagram of a probably density function.

FIG. 17 illustrates a diagram 1700 showing power level versus probability for high and low density areas. The result of the statistical evaluation is one or more probability density functions for different AP density models. These models are then used by the designers and the service to select appropriate RSSI triggers that match the density of the AP deployments. Bayesian inference is used to train the model to the actual WLAN environments the mobile device is used in. By providing appropriate RSSI triggers which invoke scanning operations by the radio module 102 in the most efficient places of a WLAN environment, the radio module 102 can save power.

In some embodiments, when the radio module 102 scans for an access point, a list of received signal power levels may be compared to the probability density functions or WLAN environment models. In various embodiments, a Bayesian inference methodology may be used to select the appropriate RSSI triggers by identifying the density of the access point deployment.

Initially, in some embodiments, the probability of being in either topology may be 0.5 but as each RSSI sample is received, the probability may be adjusted according to the formula shown in Equation (1) as follows:

$$P(H_{high} \mid S) = \frac{P(S \mid H_{high})P(H_{high})}{P(S \mid H_{high})P(H_{high}) + P(S \mid H_{low})P(H_{low})} \quad \text{Equation (1)}$$

where H-high is the high density network hypothesis, H-low is the low density hypotheses and S is the sample RSSI measurement from an AP that is received.

In various embodiments, the resulting value may be used as the P(H-high) for the next sample. In this way, the model may adapt as needed and may statically discount samples that do not provide a clear distinction between the two hypotheses. In various embodiments, more than two hypotheses are possible but only two hypotheses are shown for purposes of illustration and not limitation. Other embodiments are described and claimed.

The Bayesian model and its inferences can help identify other quality of service parameters including co-existence related settings such as fragmentation, aggregation, packet retries, rate selection, TCP window size, RF and BUS clocks, among other communications parameters.

Figure 18:
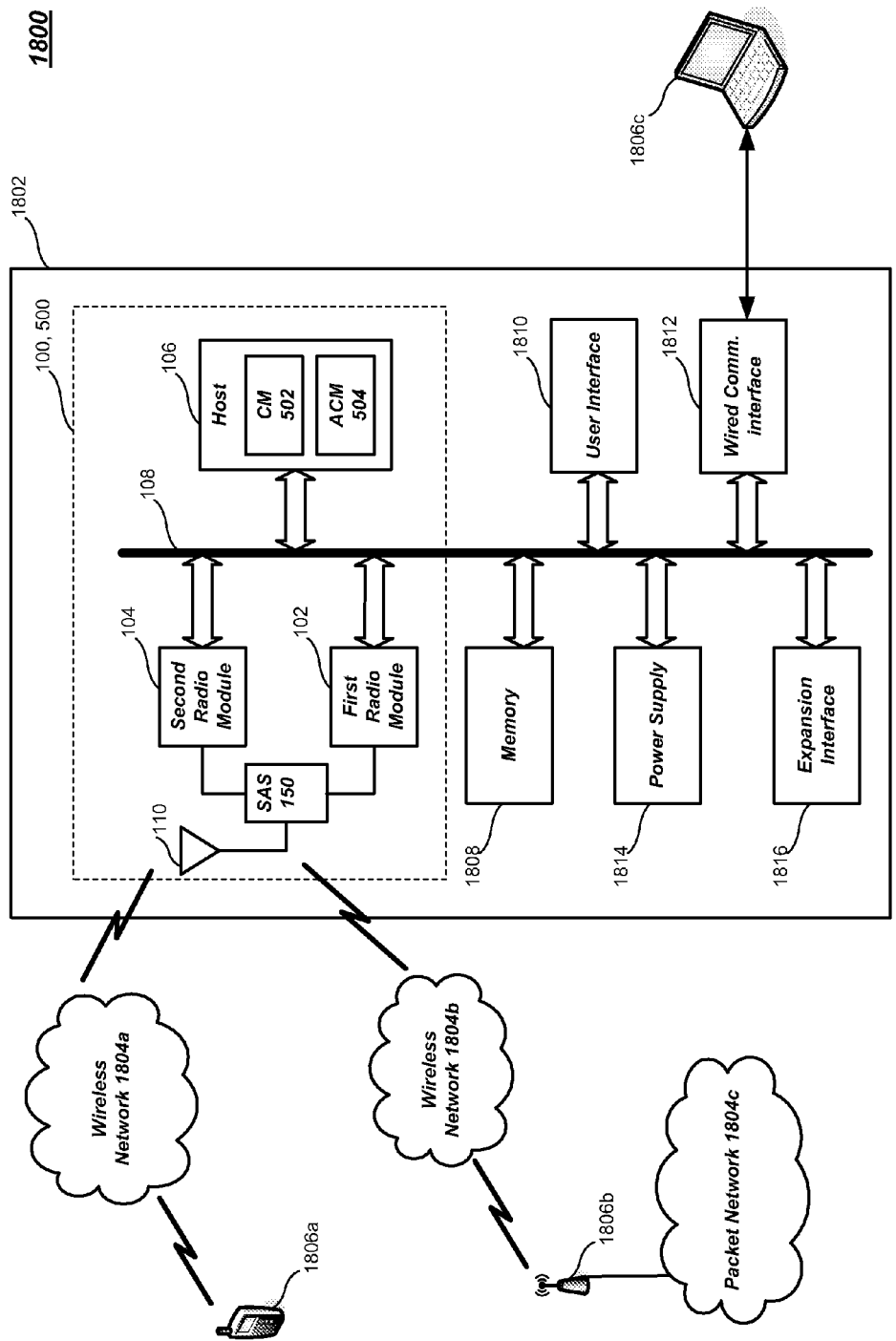
FIG. 18 illustrates one embodiment of a system.

FIG. 18 illustrates an embodiment of a system 1800. This system may be suitable for use with one or more embodiments described herein, such as apparatus 100, apparatus 200, apparatus 300, logic flow 400, apparatus 500, diagram 600, and so forth. Accordingly, system 1800 may engage in wireless communications across various link types, such as the ones described herein. In addition, system 1800 may perform various user applications.

As shown in FIG. 18, system 1800 may include a device 1802, multiple communications networks 1804, and one or more remote devices 1806. FIG. 18 shows that device 1802 may include the elements of FIG. 1. Additionally or alternatively, device 1802 may include the elements of FIG. 5. In the illustrated embodiment shown in FIG. 18, device 1802 may include a memory 1808, a user interface 1810, a wired communications interface 1812, a power supply 1814, and an expansion interface 1816.

Device 1802 may illustrate any wireless device suitable for implementing various embodiments as described herein. The wireless device may comprise a mobile or stationary device. In one embodiment, for example, the device 1802 may be implemented as a combination handheld computer and mobile telephone, sometimes referred to as a smart phone. It can be appreciated that the device may comprise a computing device having a handheld form factor. While certain exemplary embodiments may be described with the device 1802 implemented as a smart phone by way of example, the device 1802 may be implemented as other types of computing devices such as a mobile telephone, a software telephone phone running on a computer, or other suitable computing device having computing and communications capabilities in accordance with the described embodiments. Exemplary computing devices may include a personal computer (PC), desktop PC, notebook PC, laptop computer, smart phone, mobile telephone, personal digital assistant (PDA), combination mobile telephone/PDA, mobile computing device, user equipment (UE), mobile unit, subscriber station, video device, television (TV) device, digital TV (DTV) device, high-definition TV (HDTV) device, media player device, gaming device, messaging device, pager, mobile internet device, tablet, netbook, or any other suitable communications device in accordance with the described embodiments.

Memory 1808 may store information in the form of data. For instance, memory 1808 may contain application documents, e-mails, sound files, and/or images in either encoded or unencoded formats. Alternatively or additionally, memory 1808 may store control logic, instructions, and/or software components. These software components include instructions that can be executed by one or more processors. Such instructions may provide functionality of one or more elements in system 1800. Exemplary elements include host processor 106, one or more components within radio modules 102 and 104, user interface 1810, and/or communications interface 1812.

Memory 1808 may be implemented using any machine-readable or computer-readable media capable of storing data, including both volatile and non-volatile memory. For example, memory 1808 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 1808 may be included in other elements of system 1800. For instance, some or all of memory 1808 may be included on a same integrated circuit or chip with elements of apparatus 100. Alternatively some portion or all of memory 1808 may be disposed on an integrated circuit or other medium, for example a hard disk drive, which is external. The embodiments are not limited in this context.

User interface 1810 facilitates user interaction with device 1802. This interaction may involve the input of information from a user and/or the output of information to a user. Accordingly, user interface 1810 may include one or more devices, such as a keyboard (e.g., a full QWERTY keyboard), a keypad, a touch screen, a microphone, and/or an audio speaker. In addition, user interface 1810 may include a display to output information and/or render images/video processed by device 1802. Exemplary displays include liquid crystal displays (LCDs), plasma displays, and video displays.

Wired communications interface 1812 provides for the exchange of information with a device 1806c (e.g., a proximate device), such as a personal computer. This exchange of information may be across one or more wired connections. Examples of such connections include USB interfaces, parallel interfaces, and/or serial interfaces. In addition, interface 1812 may provide for such exchanges across wireless connections(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 1812 may include various components, such as a transceiver and control logic to perform operations according to one or more communications protocols. In addition, communications interface 1812 may include input/output (I/O) adapters, physical connectors to connect the I/O adapter with a corresponding communications medium.

FIG. 18 shows that device 1802 may communicate across wireless networks 1804a and 1804b. In particular, FIG. 18 shows communications across network 1804a being handled by second radio module 104, and communications across network 1804b being handled by first radio module 102. Accordingly, first wireless network 1804a may be a cellular network, while second wireless network 1804b may be a wireless data network. However, the embodiments are not limited to these examples.

Such wireless communications allow device 1802 to communicate with various remote devices. For instance, FIG. 18 shows device 1802 engaging in wireless communications (e.g., telephony or messaging) with a mobile device 1806a. In addition, FIG. 18 shows device engaging in wireless communications (e.g., WLAN, WMAN, and/or PAN communications) with an access point 1806b. In turn access point 1806b may provide device 1802 with access to further communications resources. For example, FIG. 18 shows access point 1806b providing access to a packet network 1804c, such as the Internet.

Power supply 1814 provides operational power to elements of device 1802. Accordingly, power supply 1814 may include an interface to an external power source, such as an alternating current (AC) source. Additionally or alternatively, power supply 1814 may include a battery. Such a battery may be removable and/or rechargeable. However, the embodiments are not limited to these examples.

Expansion interface 1816 may be in the form of an expansion slot, such as a secure digital (SD) slot. Accordingly, expansion interface 1816 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a first radio module to communicate wirelessly across a first link using a first set of communications channels;
a second radio module to communicate wirelessly across a second link using a second set of communications channels, the first and second set of communications channels having a certain number of shared frequencies; and
a coordination module communicatively coupled with the first and second radio modules, the coordination module to receive information regarding operation of first and second radio modules, select a set of masked channels using the shared frequencies based on the received information from the first and second radio modules, and send a control directive to at least one of the first and second radio modules to operate using one or more communications channels outside of the set of masked channels and permit the first radio module and the second radio module to operate at the same time, the coordination module to modify the set of masked channels when the first radio module or the second radio module switches to a different communications channel.

2. The mobile computing device of claim 1, the coordination module to select the set of masked channels based on a communications channel used by the first radio module or the second radio module.

3. The mobile computing device of claim 1, the coordination module to select the set of masked channels centered on a center frequency for a communications channel used by the first radio module or the second radio module.

4. The mobile computing device of claim 1, the coordination module to select the set of masked channels based on information about a traffic type, a priority level or a direction for the first radio module or the second radio module.

5. The mobile computing device of claim 1, the first or second radio module to communicate using the one or more communications channels that are not included within the set of masked channels.

6. The mobile computing device of claim 1, comprising an antenna and a shared antenna structure, the shared antenna structure comprising a combiner and at least one switch arranged to allow the first radio module and the second radio module to share the antenna for simultaneous operations or mutually-exclusive operations.

7. The mobile computing device of claim 6, the shared antenna structure comprising a first switch communicatively coupled with the first radio module, a second switch communicatively coupled with the second radio module, a combiner communicatively coupled with the first and second switches, and a third switch communicatively coupled with the first switch, the second switch and the combiner.

8. The mobile computing device of claim 6, the shared antenna structure comprising a first switch communicatively coupled with the first radio module, a combiner communicatively coupled with the first switch and the second radio module, and a second switch communicatively coupled with the first switch and the combiner.

9. A method, comprising:
receiving information regarding operation of first and second radio modules using first and second sets of communications channels having a certain number of shared frequencies;
selecting a set of masked channels using the shared frequencies based on the received information from the first and second radio modules;
sending a control directive to at least one of the first and second radio modules to operate using one or more communications channels outside of the set of masked channels to permit the first and second radio modules to operate at the same time; and
modifying the set of masked channels when the first radio module or the second radio module switches to a different communications channel.

10. The method of claim 9, comprising selecting the set of masked channels based on a communications channel used by the first radio module or the second radio module.

11. The method of claim 9, comprising selecting the set of masked channels centered on a center frequency for a communications channel used by the first radio module or the second radio module.

12. The method of claim 9, comprising selecting the set of masked channels based on information about a traffic type, a priority level or a direction for the first radio module or the second radio module.

13. The method of claim 9, comprising communicating using the one or more communications channels that are not included within the set of masked channels.

14. An article comprising a storage medium containing instructions that when executed enable a system to:
receive information regarding operation of first and second radio modules using first and second sets of communications channels having a certain number of shared frequencies;
select a set of masked channels using the shared frequencies based on the received information from the first and second radio modules;
send a control directive to at least one of the first and second radio modules to operate using one or more communications channels outside of the set of masked channels to permit the first and second radio modules to operate at the same time; and
modify the set of masked channels when the first radio module or the second radio module switches to a different communications channel.

15. The article of claim 14, further comprising instructions to select the set of masked channels based on a communications channel used by the first radio module or the second radio module.

16. The article of claim 14, further comprising instructions to select the set of masked channels centered on a center frequency for a communications channel used by the first radio module or the second radio module.

17. The article of claim 14, further comprising instructions to select the set of masked channels based on information about a traffic type, a priority level or a direction for the first radio module or the second radio module.

* * * * *